US012195126B2

(12) United States Patent
Chang et al.

(10) Patent No.: US 12,195,126 B2
(45) Date of Patent: Jan. 14, 2025

(54) MICROMOBILITY TRANSIT VEHICLE REAR TRIANGLE CONFIGURATION

(71) Applicant: Lyft, Inc., San Francisco, CA (US)

(72) Inventors: Calvin Jye Chang, Oakland, CA (US); Eahab Nagi El Naga, San Francisco, CA (US); Erica Catherine Keenan, San Francisco, CA (US); Chen-Yu Lin, Santa Clara, CA (US); Andrew Michael Reimer, San Francisco, CA (US); Joseph Daniel Taylor, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 789 days.

(21) Appl. No.: 17/121,517

(22) Filed: Dec. 14, 2020

(65) Prior Publication Data

US 2022/0185407 A1 Jun. 16, 2022

(51) Int. Cl.
*B62H 5/00* (2006.01)
*B62H 5/14* (2006.01)
*B62J 43/20* (2020.01)

(52) U.S. Cl.
CPC ............ *B62H 5/003* (2013.01); *B62H 5/14* (2013.01); *B62J 43/20* (2020.02)

(58) Field of Classification Search
CPC . B62H 5/003; B62H 5/14; B62J 43/20; E05B 71/00
USPC ......................................................... 70/233
See application file for complete search history.

(56) References Cited

U.S. PATENT DOCUMENTS

| | | | | |
|---|---|---|---|---|
| 3,990,279 A | * | 11/1976 | Brickel | B62H 5/003 70/233 |
| 4,028,916 A | * | 6/1977 | Pender | E05B 67/003 70/49 |
| 4,033,160 A | * | 7/1977 | Mima | B62H 5/003 70/227 |

(Continued)

FOREIGN PATENT DOCUMENTS

| | | |
|---|---|---|
| CN | 2551560 Y | 5/2003 |
| CN | 205022738 U | 2/2016 |
| KR | 20190133990 A | 12/2019 |

OTHER PUBLICATIONS

International Search Report and Written Opinion for International Application No. PCT/US2021/062841, 12 pages, Apr. 15, 2022.

*Primary Examiner* — Christopher B Wehrly
(74) *Attorney, Agent, or Firm* — Baker Botts L.L.P.

(57) ABSTRACT

Techniques are disclosed for a rear triangle configuration for a micromobility transit vehicle. In accordance with one or more embodiments, a micromobility transit vehicle is provided. The micromobility transit vehicle may include a seat tube, a wishbone seat stay including a fork and post connecting the fork to the seat tube, a collar connected to the post and rotatable about an axis defined by the post, and a lock cable connected to the collar to rotate about the post. The fork may be connected to a pair of chain stays, such as via a pair of rear dropouts, to extend around a portion of a rear wheel. The rear dropouts may include a vertical dropout structure and positively lock to an electric motor, such as via complementary structures. A channel may be disposed in a rear dropout to receive a motor cable running to the electric motor.

20 Claims, 17 Drawing Sheets

(56) References Cited

U.S. PATENT DOCUMENTS

| | | | | |
|---|---|---|---|---|
| 4,126,024 | A * | 11/1978 | Timmons | E05B 67/006 |
| | | | | 242/379.2 |
| 4,970,882 | A * | 11/1990 | Arrendondo | B62H 5/003 |
| | | | | 242/379.2 |
| 5,197,310 | A * | 3/1993 | Pedersen | B62H 5/147 |
| | | | | 70/227 |
| 5,476,278 | A * | 12/1995 | Levin | B62K 19/00 |
| | | | | 280/281.1 |
| 12,037,817 | B2 * | 7/2024 | Radenbaugh | B62H 5/147 |
| 2015/0225038 | A1 | 8/2015 | Talavasek | |
| 2020/0331549 | A1 | 10/2020 | Leudtke | |

* cited by examiner

MICROMOBILITY TRANSIT VEHICLE REAR TRIANGLE CONFIGURATION

TECHNICAL FIELD

One or more embodiments of the present disclosure relate generally to micromobility transit vehicles and more particularly, for example, to rear triangle configurations for a micromobility transit vehicle.

BACKGROUND

Legacy designs for micromobility vehicles for hire (e.g., shared scooters, sit-scooters, bicycles, etc.) can include one or more exposed components (e.g., batteries, cables, control units, locks, etc.). In such designs, the exposed components are often subject to theft, vandalism, and other damage. For instance, the exposed components can present many pry points permitting, either collectively or individually, a large amount of leverage to be applied by vandals. The exposed components may also be cut, damaged, or otherwise tampered with. The micromobility vehicles may include one or more unused spaces, such as in a rear triangle portion of the vehicle, that could otherwise be used to house, conceal, or hold the components.

Therefore, there is a need in the art for a rear triangle configuration that addresses the deficiencies noted above, other deficiencies known in the industry, or at least offers an alternative to current techniques. For example, improvements are needed to streamline one or more components within the rear triangle of a micromobility transit vehicle.

SUMMARY

Techniques are disclosed for a rear triangle configuration for a micromobility transit vehicle. In accordance with one or more embodiments, a micromobility transit vehicle is provided. The micromobility transit vehicle may include a wishbone seat stay including a fork and a post configured to connect the fork to a seat tube, a collar connected to the post and rotatable about an axis defined by the post, and a lock cable connected to the collar to rotate about the post.

One or more embodiments provide a micromobility transit vehicle. The micromobility transit vehicle may include a rear triangle including a seat tube, a pair or rear dropouts, a pair of chain stays extending between the seat tube and the pair of rear dropouts, and a wishbone seat stay comprising a fork connected to the pair of rear dropouts and a post connecting the fork to the seat tube. The micromobility transit vehicle may include a rear wheel including a rear axle coupled to the pair of rear dropouts, a collar connected to the post and rotatable around the post, and a lock cable connected to the collar to rotate about the post.

One or more embodiments provide a method of locking a micromobility transit vehicle including a seat tube, a wishbone seat stay including a fork and a post connecting the fork to the seat tube, and a lock cable rotatably connected to the post. The method may include rotating the lock cable about the post to position a pin of the lock cable adjacent to a lock, and engaging the pin with the lock.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
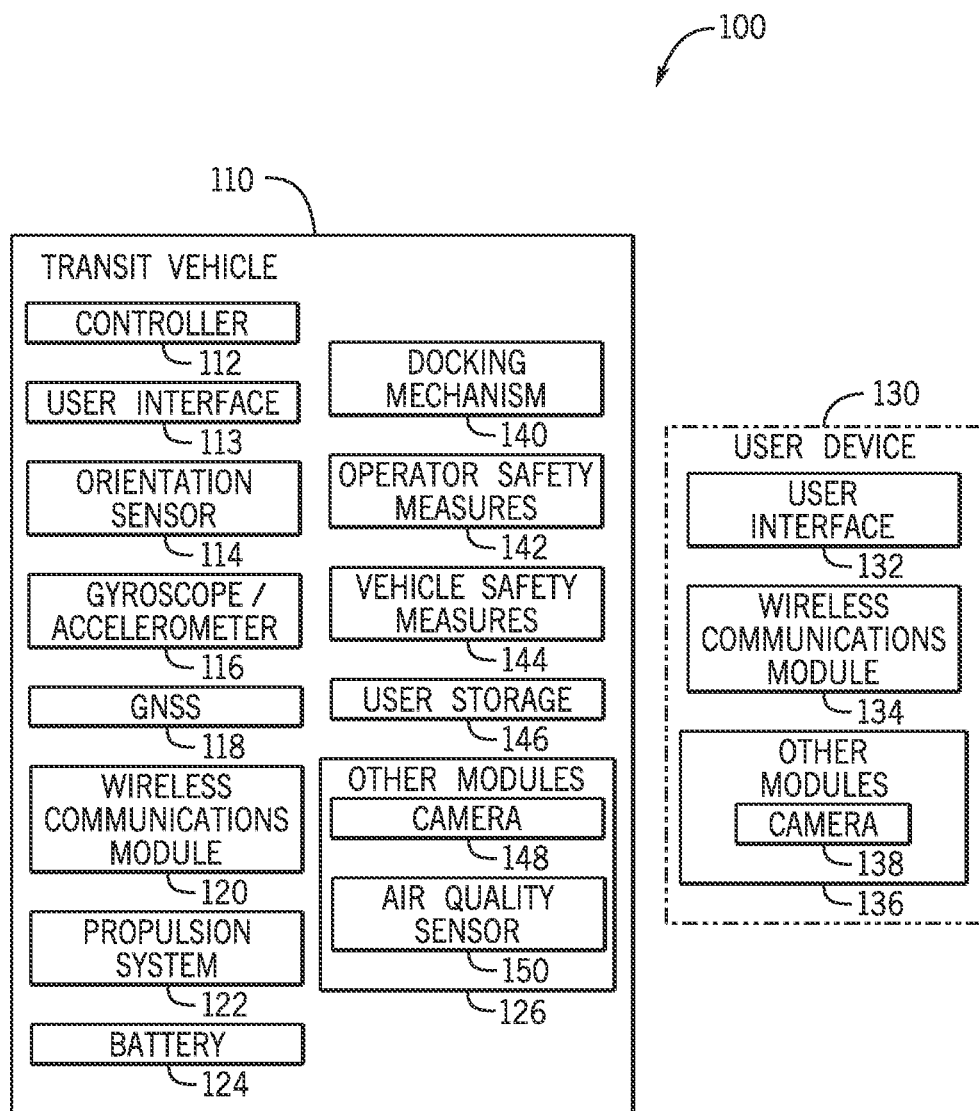
FIG. 1 illustrates a block diagram of a portion of a dynamic transportation matching system including a transit vehicle, in accordance with an embodiment of the disclosure.

Embodiments of the invention and their advantages are best understood by referring to the detailed description that

DETAILED DESCRIPTION

In accordance with various embodiments of the present disclosure, a rear triangle configuration is provided. The rear triangle may include a wishbone-shaped seat stay structure connecting a seat tube to a pair of rear dropouts. A single post (e.g., rod, pin, bolt, etc.) connects a fork of the seat stay to the seat tube. One end of a lock cable is rotatably connected to the post, such that the lock cable rotates around the post about an axis defined by or parallel to the post. When connected to the post, the end of the lock cable may become part of the integral structure of the rear triangle. The lock cable may be secured to a lock connected to the rear triangle. For example, the lock may be attached to the fork of the seat stay, such as via a horseshoe-shaped bracket. The bracket may be positioned beneath a rear fender and designed to provide a spring-like play for a compliant base for the lock and to reduce impact forces.

The rear dropouts may include a vertical dropout structure. The rear dropouts may be shaped to complementarily engage an electric motor to positively lock the electric motor to the rear dropouts. For example, one or both rear dropouts may include a spline, such as running parallel to the rear axle. A complementary groove may be disposed in the electric motor, such that connection of the electric motor to the rear dropouts positions the spline of the rear dropouts within the complementary groove of the electric motor, limiting rotation of the electric motor relative to the rear dropouts.

At least one rear dropout may provide a tamper protection characteristic, such as due to the rear dropout concealing a motor cable from view. For instance, a channel may be disposed in a rear dropout to receive the motor cable therein. The motor cable may run from the electric motor, through the channel of the rear dropout, and into a compartment defined adjacent to one of the chain stays of the rear triangle. The compartment may house a motor control unit (MCU) of the micromobility transit vehicle, taking advantage of available space and positioning the MCU adjacent to the rear wheel (e.g., longitudinally along the chain stay at a position between the rear axle and the rear tire).

Other portions of the frame may include strengthening and/or convenience features. For example, a downtube of the frame may include a battery compartment to at least partially receive a battery. The downtube may include one or more strengthening walls or features to define the battery compartment and/or increase stiffness of the downtube. A cable channel may be disposed along the bottom of the battery compartment to route one or more cables (e.g., battery cables, control cables, communication cables, etc.) below the battery and through the downtube. The frame may include a bottom bracket node connecting the downtube to the seat tube and/or rear triangle. The bottom bracket node, which may be a separate forged or extruded piece, provides a needed stiffness of the frame.

FIG. 1 illustrates a block diagram of a portion of a dynamic transportation matching system 100 (e.g., system 100) including a transit vehicle 110 in accordance with an embodiment of the disclosure. In the embodiment shown in FIG. 1, system 100 includes transit vehicle 110 and optionally a user device 130. In general, transit vehicle 110 may be a passenger vehicle designed to transport a single person (e.g., a micromobility transit vehicle, a transit bike and scooter vehicle, or the like) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micromobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a fleet manager/servicer providing transit vehicle 110 for rental and use by the public as one or more types of transportation modalities offered by a dynamic transportation matching system, for example. In some embodiments, transit vehicles similar to transit vehicle 110 may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100, such as a transportation requester or rider.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a transportation requester or rider via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link directly or indirectly established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micromobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a transportation requester or rider and/or used by other devices of system 100 (e.g., controller 112) to provide operational control of transit vehicle 110 and/or system 100. In further embodiments, other modules 126 may include a light, such as a head light or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility transit vehicle, as described herein.

Transit vehicles implemented as micromobility transit vehicles may include a variety of additional features designed to facilitate fleet management and rider and environmental safety. For example, as shown in FIG. 1, transit vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user, such as a transportation requester or rider. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a transportation requester or rider and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
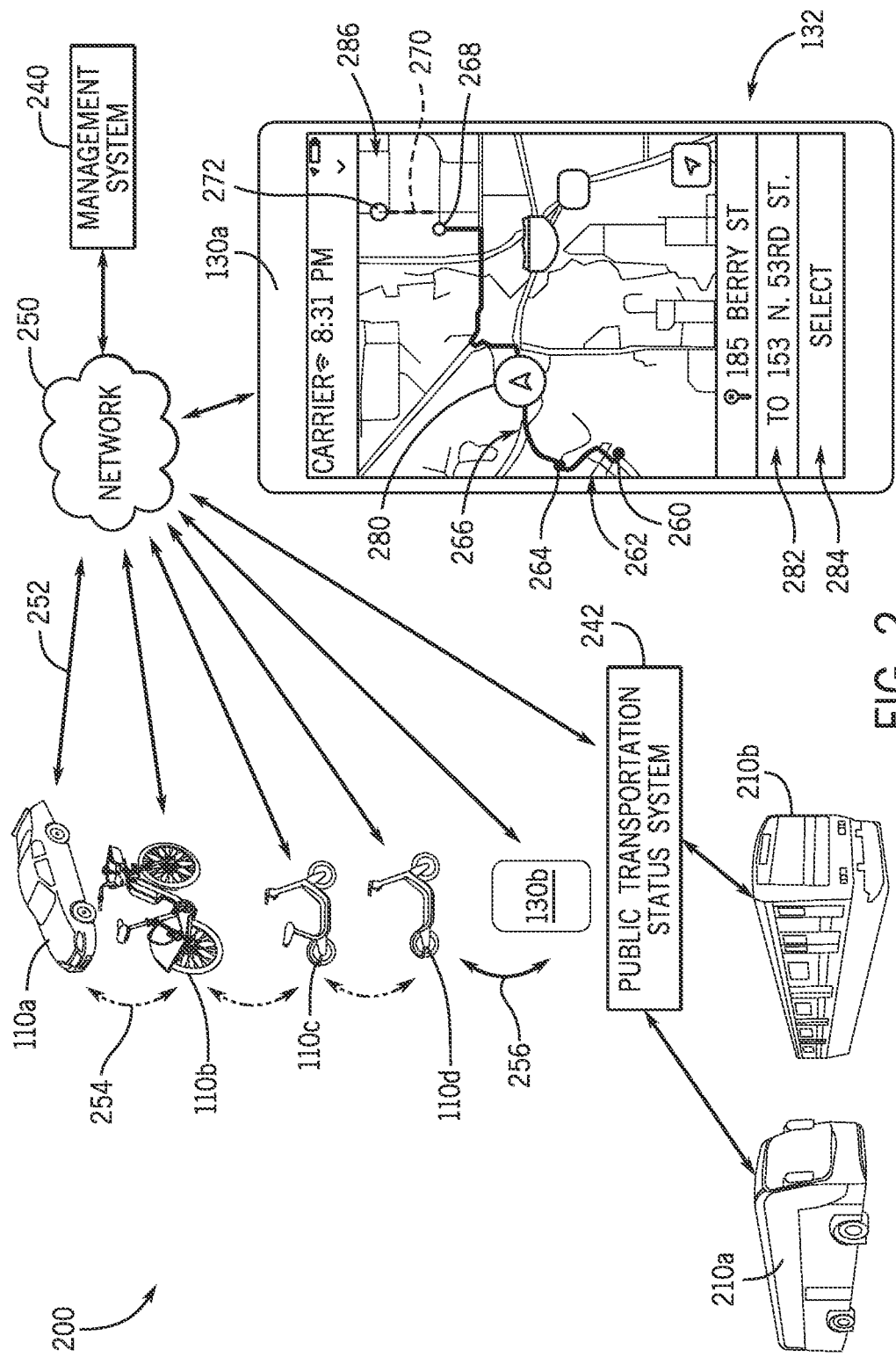
FIG. 2 illustrates a block diagram of a dynamic transportation matching system incorporating a variety of transportation modalities, in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, user device 130a may receive an input with a request for transportation with one or more transit vehicles 110a-d and/or public transportation vehicles 210a-b. For example, the transportation request may be a request to use (e.g., hire or rent) one of transit vehicles 110a-d. The transportation request may be transmitted to management system 240 over WAN 250, allowing management system 240 to poll status of transit vehicles 110a-d and to select one of transit vehicles 110a-d to fulfill the transportation request. Upon or after one of the transit vehicles 110a-d is selected to fulfill the transportation request, a fulfillment notice from management system 240 and/or from the selected transit vehicle 110a-d may be transmitted to the user device 130a. In some embodiments, navigation instructions to proceed to or otherwise meet with the selected transit vehicle 110a-d may be sent to the user device 130a. A similar process may occur using user device 130b, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110a-d, as described herein.

User device 130a in FIG. 2 includes a display of user interface 132 that shows a planned route for a transportation requester or rider attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210a or 210b), and a micromobility route 270 (e.g., using one or more of micromobility transit vehicles 110b, 110c, or 110d) from bus stop 268 to destination 272. Also shown rendered by user interface 132 are a present location indicator 280 (indicating a present absolute position of user device 130a on street map 286), a navigation destination selector/indicator 282 (e.g., configured to allow a transportation requester or rider to input a desired navigation destination), and a notice window 284 (e.g., used to render vehicle status data or other information, including user notices and/or alerts, as described herein). For example, a transportation requester or rider may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a transportation requester or rider (e.g., initially and/or while traversing a particular planned route), and a transportation requester or rider may select or make changes to such a route through manipulation of user device 130a, as shown. For example, management system 240 may be configured to suggest a quickest route, a least expensive route, a most convenient route (to minimize modality changes or physical actions a transportation requester or rider must take along the route), an inclement weather route (e.g., that keeps the transportation requester or rider protected from inclement weather a maximum amount of time during route traversal), or some combination of those that is determined as best suited to the transportation requester or rider, such as based on various user preferences. Such preferences may be based on prior use of system 200, prior user trips, a desired arrival time and/or departure time (e.g., based on user input or obtained through a user calendar or other data source), or specifically input or set by a user (e.g., a transportation requester or rider) for the specific route, for example, or in general. In one example, origination point 260 may be extremely congested or otherwise hard to access by a ride-share transit vehicle, which could prevent or significantly increase a wait time for the transportation requester or rider and a total trip time to arrive at destination 272. In such circumstances, a planned multimodal route may include directing the transportation requester or rider to walk and/or take a scooter/bike to an intermediate and less congested location to meet a reserved ride-share vehicle, which would allow the transportation requester or rider to arrive at destination 272 quicker than if the ride-share vehicle was forced to meet the transportation requester or rider at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
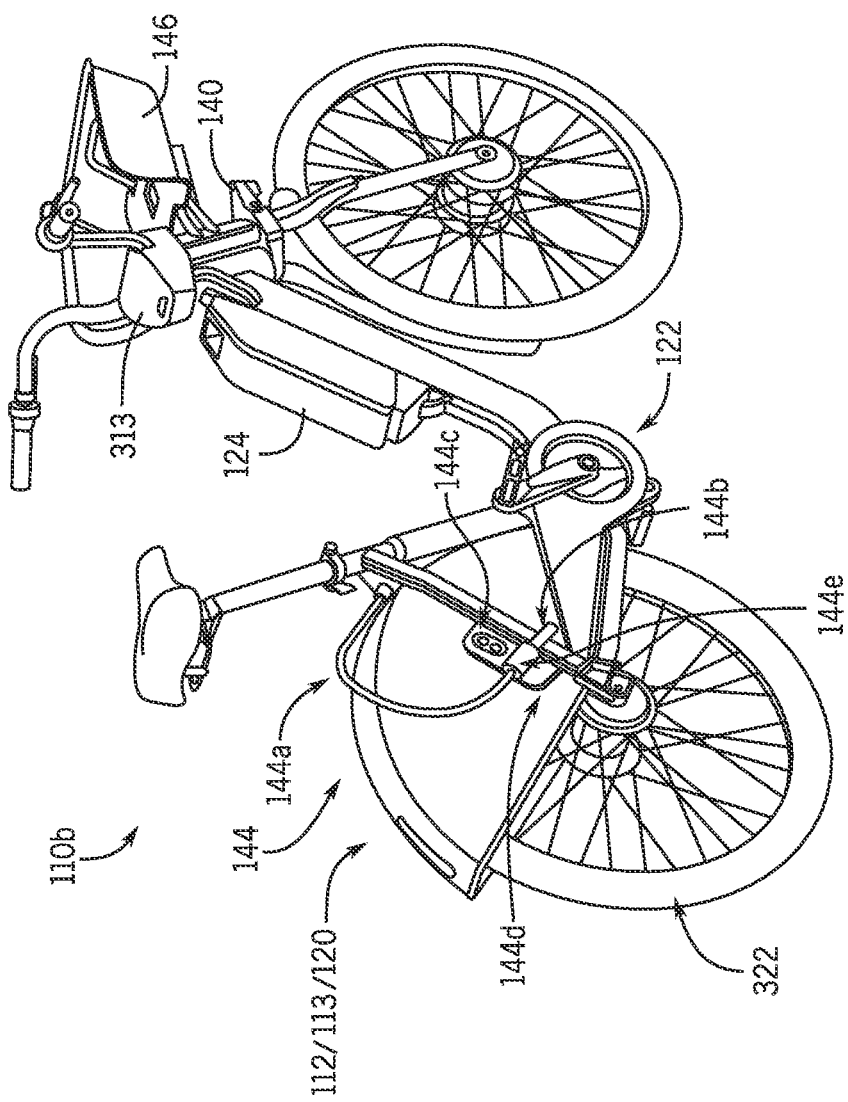
FIGS. 3A, 3B, and 3C illustrate respective diagrams of micromobility transit vehicles for use in a dynamic transportation matching system, in accordance with an embodiment of the disclosure.
Figure 3B:
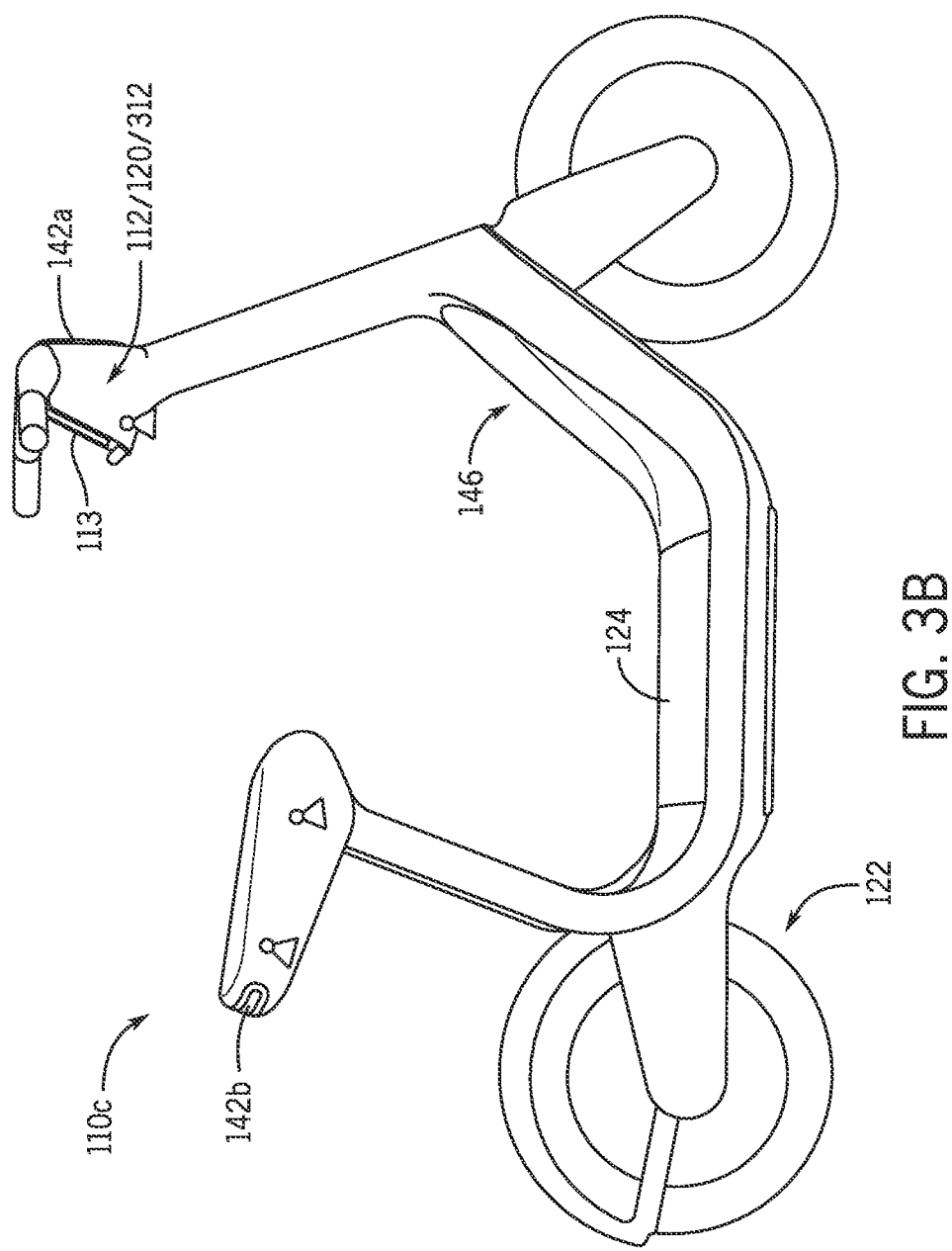
Figure 3C:
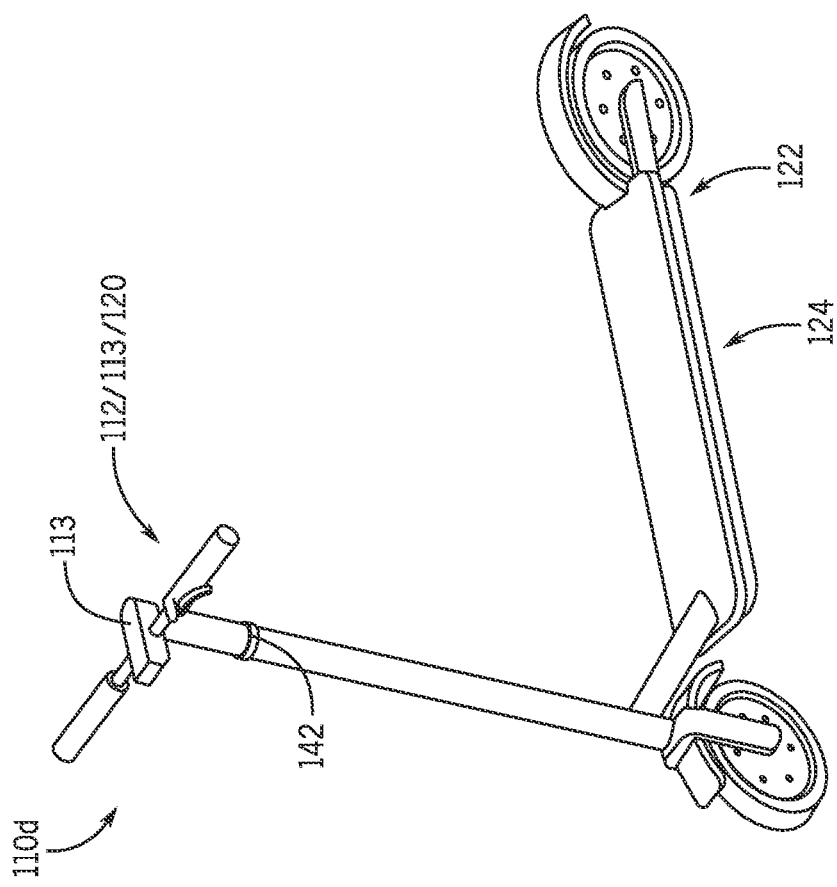

FIGS. 3A, 3B, and 3C illustrate respective diagrams of micromobility transit vehicles 110b, 110c, and 110d, which may be integrated network systems in accordance with an embodiment of the disclosure. For example, transit vehicle 110b of FIG. 3A may correspond to a motorized bicycle integrated with the various elements of system 100 and may be configured to participate in dynamic transportation matching system 200 of FIG. 2. As shown, transit vehicle 110b includes controller/user interface/wireless communications module 112/113/120 (e.g., integrated with a rear fender of transit vehicle 110b), propulsion system 122 configured to provide motive power to at least one of the wheels (e.g., a rear wheel 322) of transit vehicle 110b, battery 124 for powering propulsion system 122 and/or other elements of transit vehicle 110b, docking mechanism 140 (e.g., a spade lock assembly) for docking transit vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of transit vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize transit vehicle 110b by default, thereby requiring a transportation requester or rider to transmit a request to management system 240 (e.g., via user device 130) to reserve transit vehicle 110b before attempting to use transit vehicle 110b. The request may identify transit vehicle 110b based on an identifier (e.g., a QR code, a barcode, a serial number, etc.) presented on transit vehicle 110b (e.g., such as by user interface 113 on a rear fender of transit vehicle 110b). Once the request is approved, management system 240 may transmit an unlock signal to transit vehicle 110b (e.g., via network 250). Upon receiving the unlock signal, transit vehicle 110b (e.g., controller 112 of transit vehicle 110b) may release vehicle security device 144 and unlock rear wheel 322 of transit vehicle 110b.

Transit vehicle 110c of FIG. 3B may correspond to a motorized sit-scooter integrated with the various elements of system 100 and may be configured to participate in dynamic transportation matching system 200 of FIG. 2. As shown in FIG. 3B, transit vehicle 110c includes many of the same elements as those discussed with respect to transit vehicle 110b of FIG. 3A. For example, transit vehicle 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of head lights, programmable light strips, and/or reflective strips.

Transit vehicle 110d of FIG. 3C may correspond to a motorized stand or kick scooter integrated with the various elements of system 100 and may be configured to participate in dynamic transportation matching system 200 of FIG. 2. As shown in FIG. 3C, transit vehicle 110d includes many of the same elements as those discussed with respect to transit vehicle 110b of FIG. 3A. For example, transit vehicle 110d may include user interface 113, propulsion system 122, battery 124, controller/wireless communications module/ cockpit enclosure 112/120/312, and operator safety measures 140, which may be implemented as various types programmable light strips and/or reflective strips, as shown.

Figure 3D:
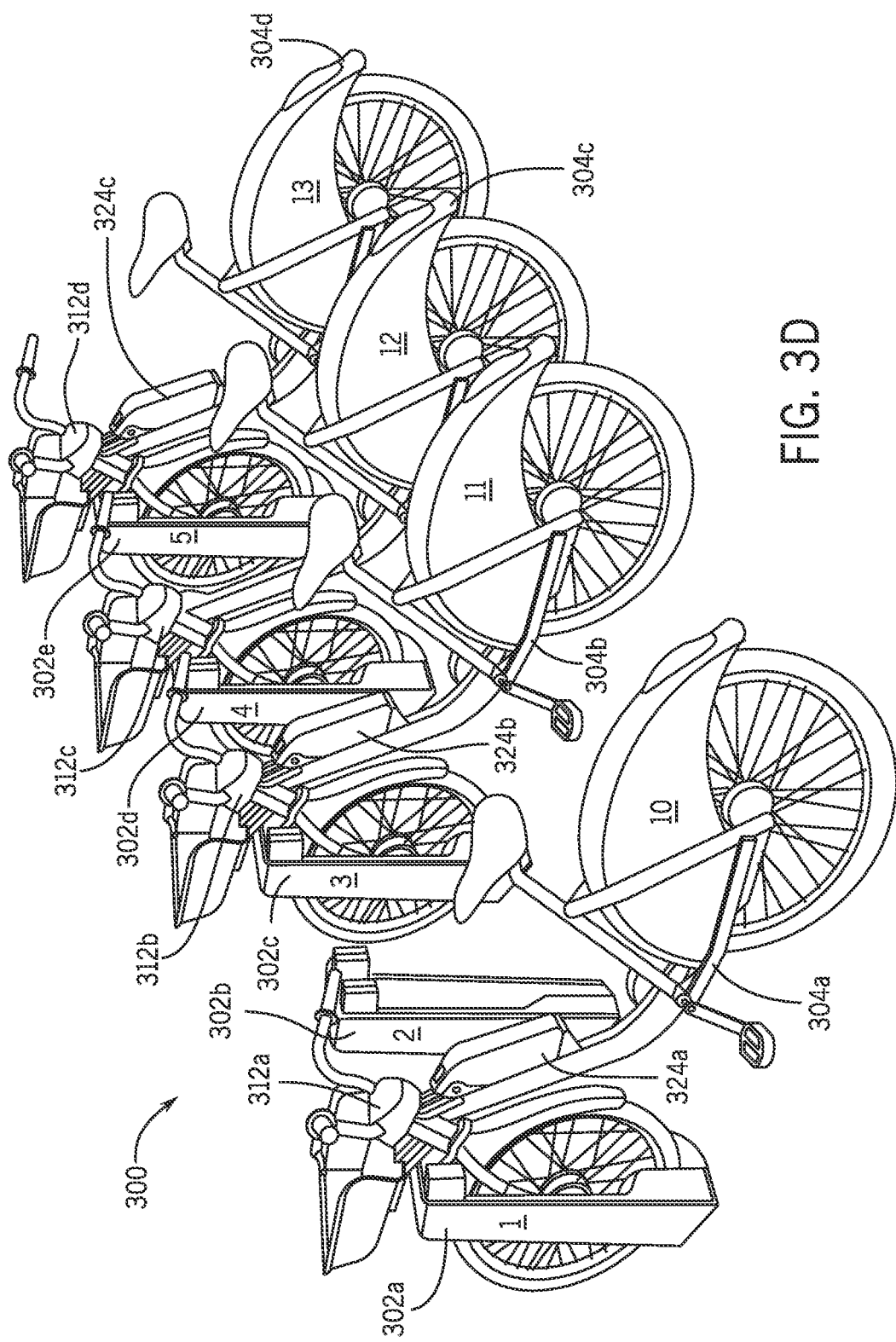
FIG. 3D illustrates a diagram of a docking station for docking one or more micromobility transit vehicles, in accordance with an embodiment of the disclosure.

FIG. 3D illustrates a docking station 300 for docking transit vehicles (e.g., transit vehicles 110c, 110e, and 110g, etc.) according to one embodiment. As shown, docking station 300 may include multiple bicycle docks, such as docks 302a-e. In this example, a single transit vehicle (e.g., any one of electric bicycles 304a-d) may dock in each of the docks 302a-e of the docking station 300. Each of the docks 302a-e may include a lock mechanism for receiving and locking docking mechanism 140 of the electric bicycles 304a-d. In some embodiments, once a transit vehicle is docked in a bicycle dock, the dock may be electronically coupled to the transit vehicle (e.g., controllers 312a-d of the transit vehicle) via a link such that the transit vehicle and the dock may communicate with each other via the link.

A transportation requester or rider may use a user device (e.g., user device 130) to use a micromobility transit vehicle 110b-d that is docked in one of the bicycle docks 302a-e by transmitting a request to management system 240. Once the request is processed, management system 240 may transmit an unlock signal to a micromobility transit vehicle 110b-d docked in the dock and/or the dock via network 250. The docking station 300 may automatically unlock the lock mechanism to release the micromobility transit vehicle 110b-d based on the unlock signal. In some embodiments, each of the docks 302a-e may also be configured to charge batteries (e.g., batteries 324a-c) of the electric bicycle 304a-d, respectively, when the electric bicycle 304a-d are docked at the docks 302a-e. In some embodiments, docking station 300 may also be configured to transmit information associated with the docking station 300 (e.g., a number of transit vehicles docked at the docking station 300, charge statuses of the docked transit vehicles, etc.) to the management system 240.

Figure 4:
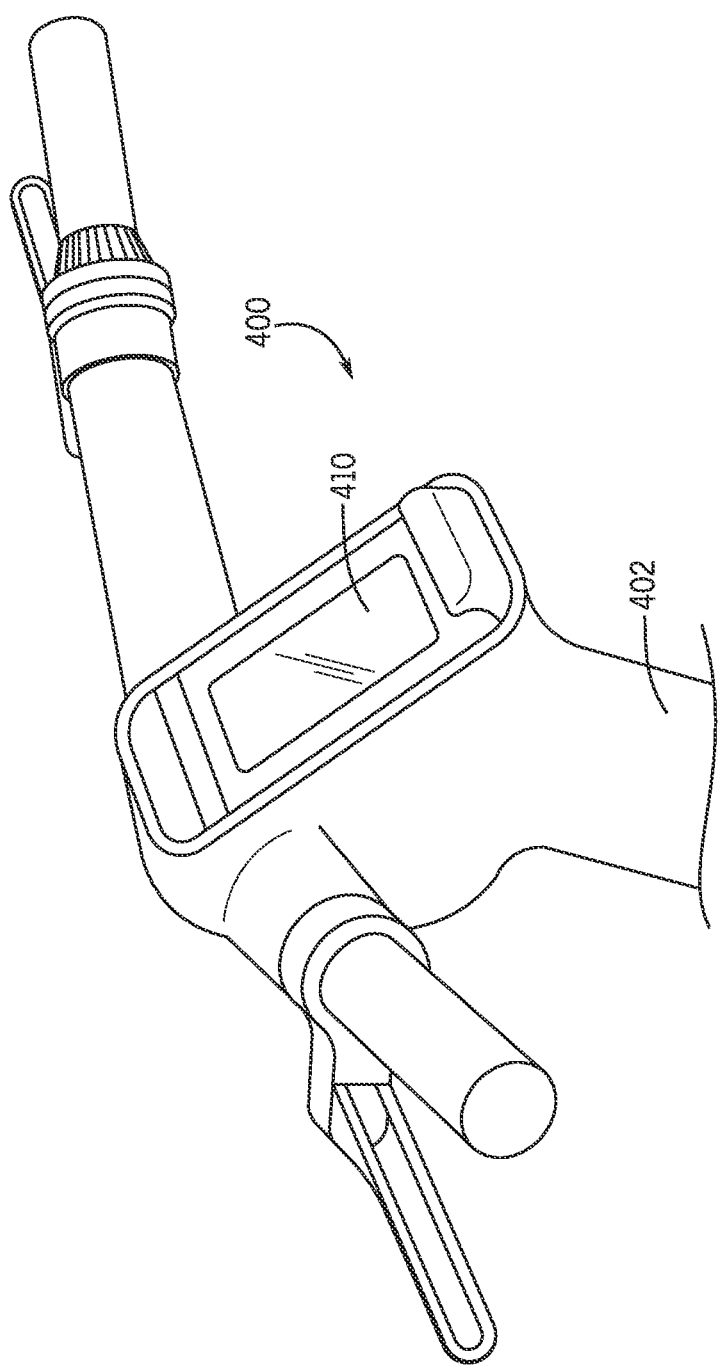
FIG. 4 illustrates a diagram of a user interface associated with a micromobility transit vehicle, in accordance with an embodiment of the disclosure.

FIG. 4 illustrates a diagram of a user interface 400 associated with a micromobility transit vehicle 402 in accordance with an embodiment of the disclosure. The micromobility transit vehicle 402 may be similar to any one of transit vehicles 110b, 110c, or 110d, described above. The user interface 400 may be integrated with the micromobility transit vehicle 402, such as integrated with at least a portion of a cockpit of the micromobility transit vehicle 402. In some embodiments, the user interface 400 may form at least a portion of an outer housing of the handlebar of the micromobility transit vehicle 402. The user interface 400 may be visible to the rider during operation. For instance, the user interface 400 may generally face rearwardly. The user interface 400 may include a display 410 configured to render information or other data. The display 410 may include many configurations, such as being an electronic ink display, although other configurations are contemplated. In other embodiments, the display 410 may be part of a mobile user computing device, such as a smart phone. As such, content, information, and data discussed herein as being presented on the display 410 can also or alternatively be displayed on the user computing device.

The user interface 400 may be similar to the user interface 113 or 132 described above. For example, route guidance information, usage cost, battery charge status, vehicle range, or other information related to the micromobility transit vehicle 402 may be rendered on the display 410. Information related to the operation of the micromobility transit vehicle 402, such as time information, map information, navigation information, instructions for operation, operational warnings or notifications, among others, may be rendered on the display 410. For example, one or more notifications may be rendered on the display 410 instructing or reminding the rider to properly lock and/or park the micromobility transit vehicle 402. In some embodiments, the user interface 400 may present information similar to that described in U.S. patent application Ser. No. 16/578,995, filed Sep. 23, 2019, and entitled "MICROMOBILITY ELECTRIC VEHICLE WITH ELECTRONIC DEVICE HOLDER AND INTEGRATED DISPLAY," which is incorporated herein in its entirety for all purposes.

Figure 5A:
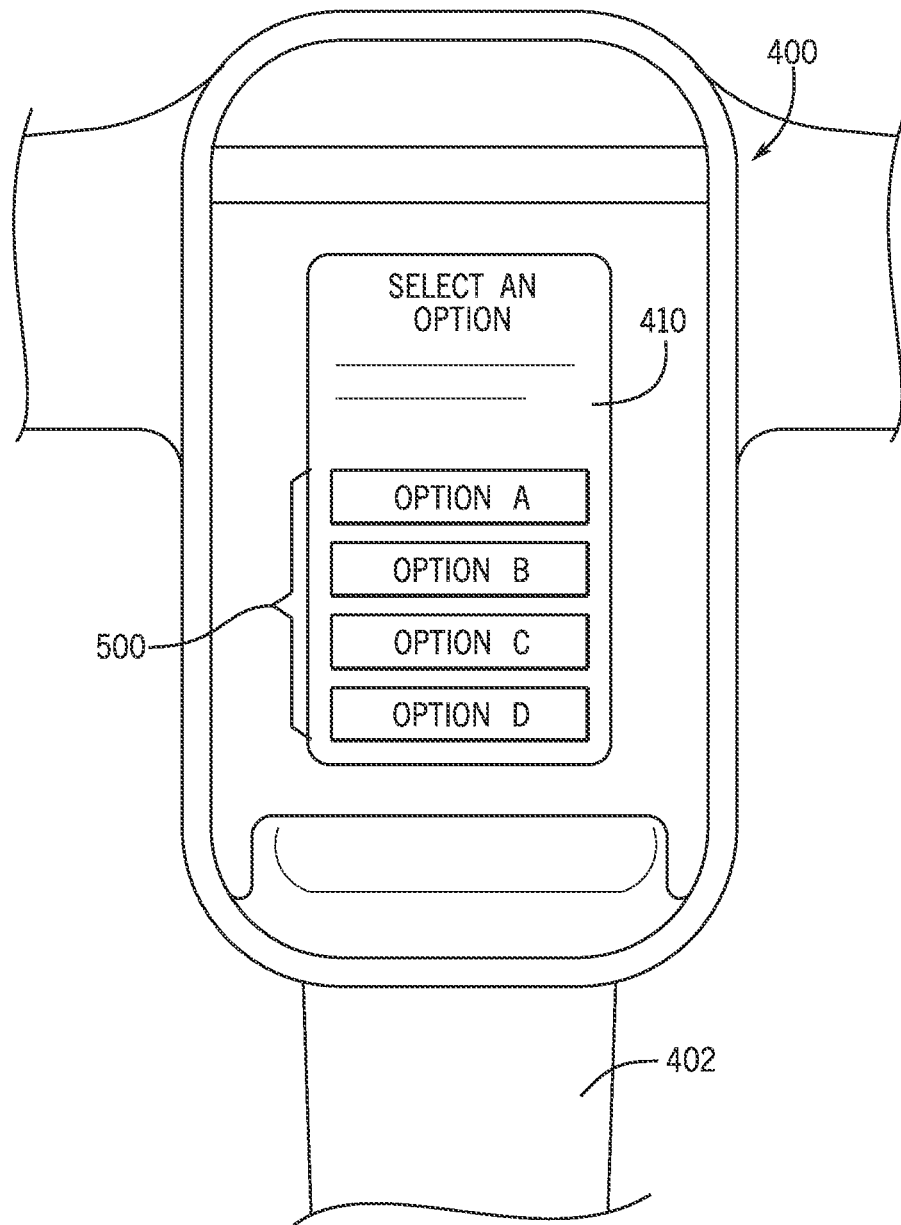
FIGS. 5A, 5B, and 5C illustrate respective diagrams of various examples of information rendered on a display of the user interface of FIG. 4, in accordance with an embodiment of the disclosure.
Figure 5B:
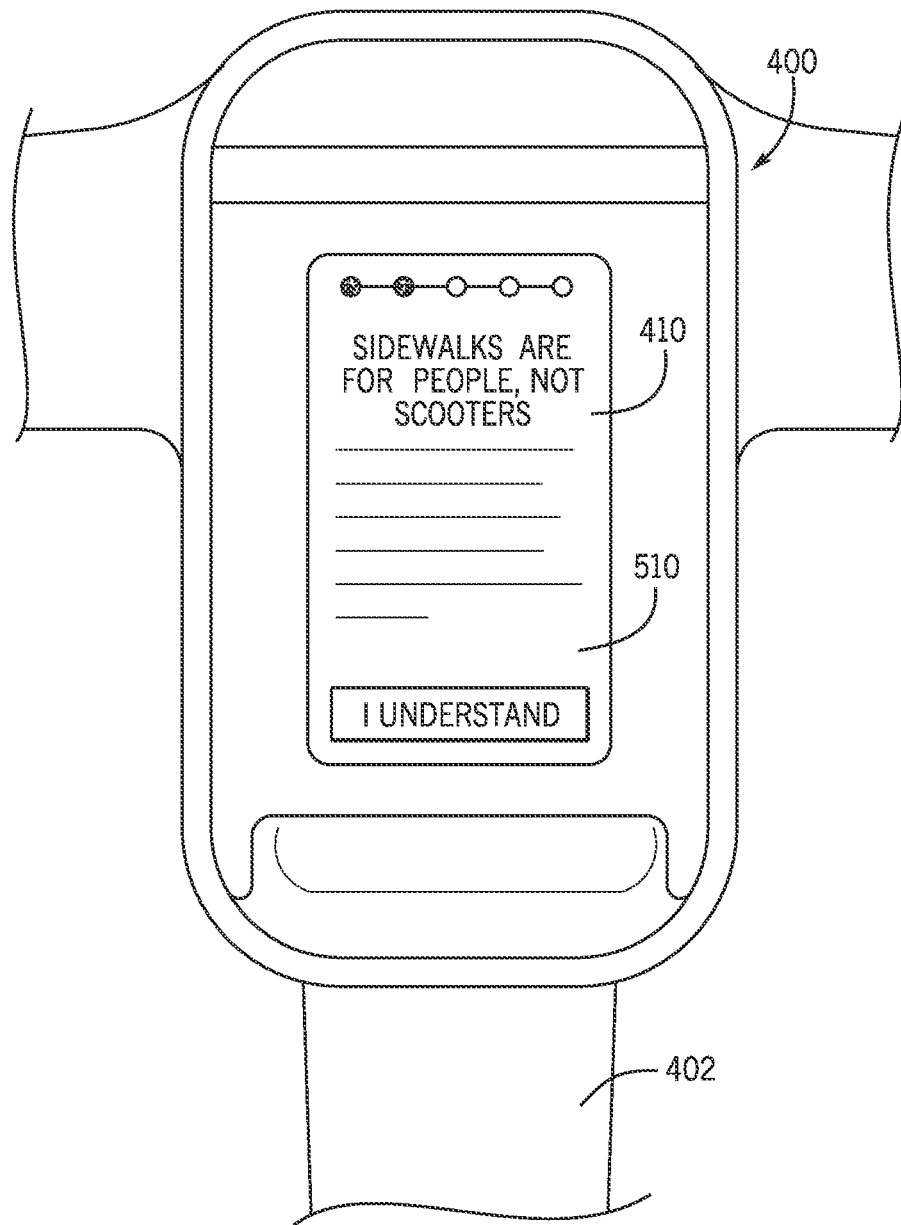
Figure 5C:
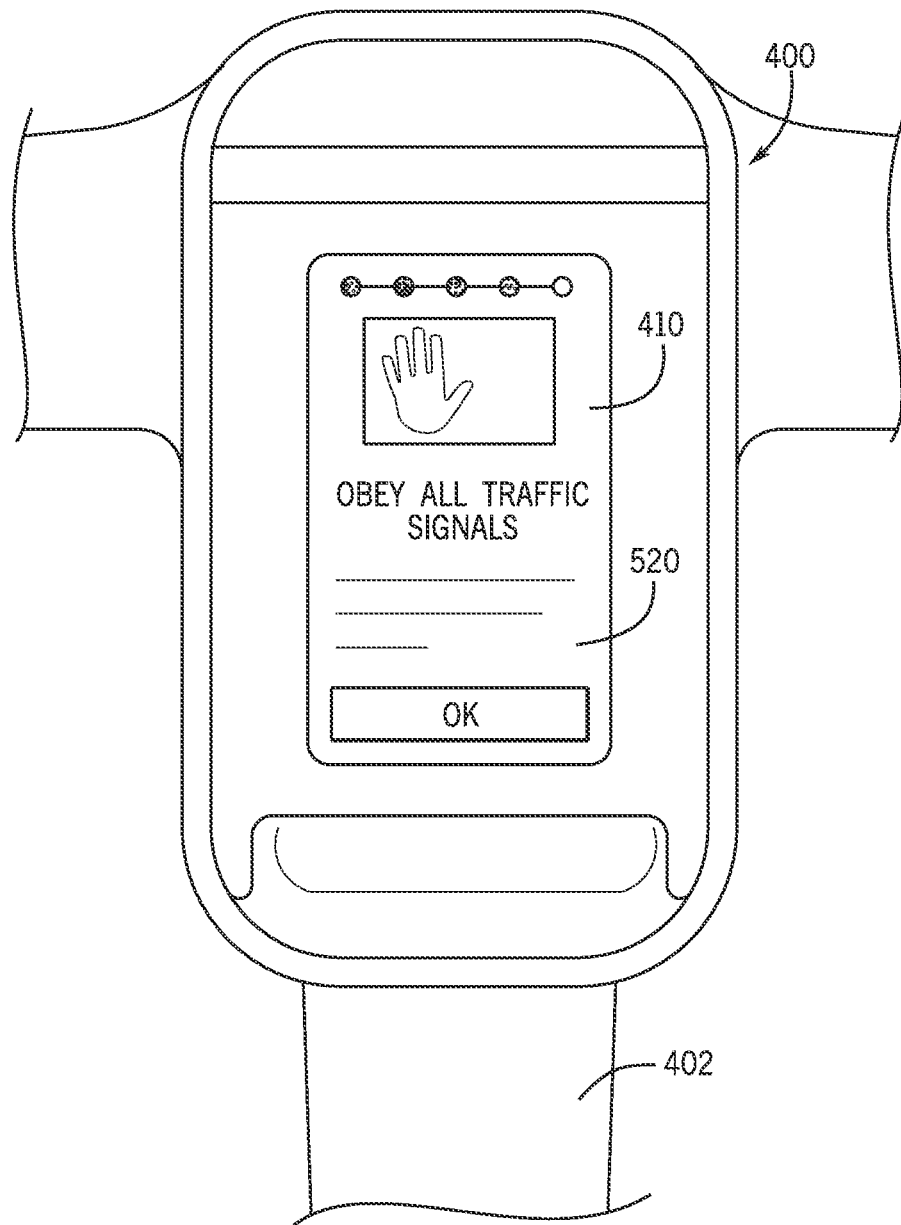

FIGS. 5A, 5B, and 5C illustrate respective diagrams of various examples of information rendered on the display 410 of the user interface 400 in accordance with an embodiment of the disclosure. The display 410 may render various information and different times, such as during operation of the micromobility transit vehicle 402, which includes starting, during, or ending a trip or prior to starting use or after ending a ride of the micromobility transit vehicle 402. For example, as shown in FIG. 5A, the display 410 may render one or more prompts, buttons, or selectable commands (hereinafter "options" 500 for sake of convenience, without intent to limit) for selection. The options 500 may prompt user selection to begin a ride, end a ride, pause a ride, or modify a ride, among others. In some embodiments, the options 500 rendered on the display 410 may allow user selection of one or more navigational commands, such as setting a starting location, setting a destination, starting navigational guidance, ending navigational guidance, modifying an existing navigation route, or the like. In some embodiments, the options 500 rendered on the display 410 may allow a transportation requester or rider to unlock the micromobility transit vehicle 402 from a docking station, pair the micromobility transit vehicle 402 to a docking station, request service or maintenance of the micromobility transit vehicle 402, report issues with the micromobility transit vehicle 402, and the like. In some embodiments, the options 500 rendered on the display 410 may allow the rider to turn on a head light assembly, turn off the head light assembly, or otherwise control operation of one or more systems of the micromobility transit vehicle 402.

Referring to FIG. 5B, the display 410 may render one or more notifications 510 related to operation of the micromobility transit vehicle 402. For instance, the display 410 may render use agreements, local rules and regulations, liability waivers, operation instructions, operation reminders, and the like for acknowledgment by the rider before, during, or after use. Referring to FIG. 5C, the display 410 may render one or more notifications 520 based on a detected condition of the micromobility transit vehicle 402. For example, the display 410 may render one or more notifications of a detected use violation (e.g., excessive speed detection, traffic signal violation, etc.), parking violation (e.g., on street, within a landscaped area, within a handicapped zone, etc.), lock violation (e.g., free locking, to an improper sign or structure, failure to lock, etc.), or any combination thereof. In other embodiments, the notifications need not be for a violation, but can be for conveying changes during operation of the micromobility transit vehicle 402, providing warnings of upcoming hazards or congestion along the ride or trip, providing reminders for use or operation, providing messages at the start and/or end of a ride, including positive messages if the user has complied with all use regulations or guidelines during the trip or user account updates, such as status, number of rides completed, or total distance traveled on the ride or over multiple rides, and offers or advertisements, such as when the micromobility transit vehicle 402 is detected as being stationary or stopped.

Figure 6:
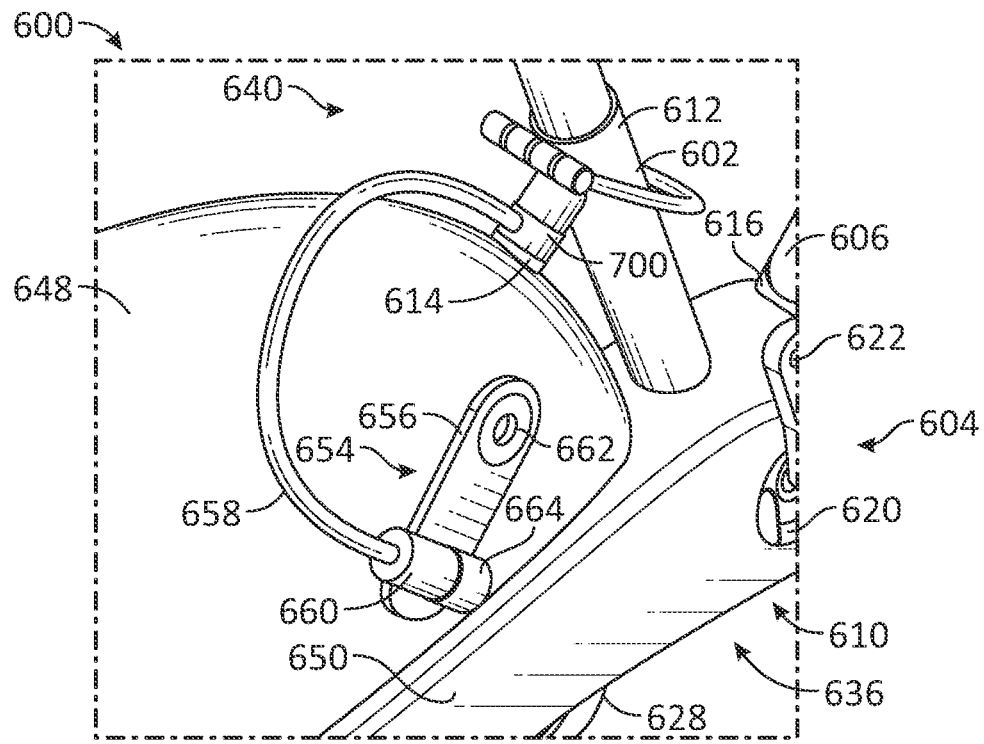
FIG. 6 illustrates a diagram of a micromobility transit vehicle, in accordance with an embodiment of the disclosure.

FIG. 6 illustrates a diagram of a micromobility transit vehicle 600 in accordance with an embodiment of the disclosure. In the illustrated embodiment, the micromobility transit vehicle 600 is a bicycle, although other configurations are contemplated, including kick scooters, sit-scooters, and the like. As shown, the micromobility transit vehicle 600 includes a frame 602, a propulsion system 604, and a battery 606. The micromobility transit vehicle 600 may be similar to any of the transit vehicles 110, 110b, 110c, or 110d, described above. Thus, any description above of like features is incorporated herein for micromobility transit vehicle 600.

The frame 602 may include many configurations. For example, the frame 602 may include any number of tubes, brackets, and other components. For instance, the frame 602 may include a bottom bracket 610, a seat tube 612, a seat stay 614, and a downtube 616, among other frame components. The bottom bracket 610 may rotatably support a portion of the propulsion system 604, such as a crankset 620 and pedals 622 configured to drive a rear wheel 628 through reciprocating motion of a rider's legs. The seat tube 612 may extend from the bottom bracket 610 and support a seat. The seat stay 614 may be connected to the seat tube 612 to provide structural support or rigidity to the frame 602. The downtube 616 may extend from the bottom bracket 610 to a head tube rotatably supporting a front fork/wheel of the micromobility transit vehicle 600. In some embodiments, the frame 602 may include other frame members, such as a pair of chain stays 636. The chain stays 636 may be connected to the bottom bracket 610 and the seat stay 614 to define a rear triangle 640 of the frame 602 with the seat tube 612. The rear triangle 640 may support the rear wheel 628, as well as other components of the micromobility transit vehicle 600, as detailed below. As a result, the frame 602 may include any number of frame members coupled together to form a support structure for the various components of the micromobility transit vehicle 600.

The propulsion system 604 may be any system or device operable to provide a motive force to at least one wheel of the micromobility transit vehicle 600 (e.g., the rear wheel 628) to propel the micromobility transit vehicle 600 across a surface (e.g., a road surface, a sidewalk, a path, a trail, etc.). The propulsion system 604 may be similar to the propulsion system 122 described above, such as including an electric motor coupled to the rear wheel 628 and a motor controller electronically coupled to the electric motor to control a motive force provided by the electric motor to the rear wheel 628. Such embodiments are illustrative only, and the propulsion system 604 may include other features, such as a brake resistor electronically coupled to the motor controller to produce a braking torque or dynamic braking on the electric motor through electrical resistance, thereby decelerating the electric motor as desired. In some embodiments, at least some portions of the propulsion system 604 may be housed within the frame 602, as described below. As described herein, "electronically coupling" or "electronically coupled" means electrically coupled together (e.g., for power coupling), communicatively coupled together (e.g., for sensor data communication), or both electrically coupled and communicatively coupled together.

The battery 606 may be configured to provide electric power to the micromobility transit vehicle 600. For example, the battery 606 may be configured to provide electric power to the propulsion system 604 (e.g., to an electric motor) to propel the micromobility transit vehicle 600, for example, as well as to various other modules of the micromobility transit vehicle 600. The battery 606 may be implemented with one or more battery cells, controllers, and/or safety measures. For example, the battery 606 may include thermal interlocks and one or more logic devices, sensors, and/or a display to monitor and provide visual feedback of a charge status of the battery 606 (e.g., a charge percentage, a low charge indicator, etc.). The battery 606 may be similar to battery 124 described above.

Other modules powered by the battery 606 may include other and/or additional sensors, actuators, communications modules, and/or user interface devices, for example. In some embodiments, the other modules may include one or more proximity sensors, cameras, lights (e.g., a headlight, indicator lights, etc.), alarms, environmental sensors, dynamic sensors, propulsion control systems, and the like. In some embodiments, the battery 606 may include an architecture similar to that described in U.S. patent application Ser. No. 16/728,600, filed Dec. 27, 2019, and entitled "VEHICLE BATTERY INTEGRATION SYSTEMS AND METHODS," or in U.S. patent application Ser. No. 16/836,259, filed Mar. 31, 2020, and entitled "VEHICLE BATTERY SECURING SYSTEMS AND METHODS," which are incorporated herein by reference in their entireties.

With continued reference to FIG. 6, the micromobility transit vehicle 600 may include other features connected to the frame 602. For example, a rear fender 648 may be connected to the frame 602, the rear fender 648 covering a portion of the rear wheel 628 to limit or prevent debris (e.g., sand, mud, rocks, liquids, and other road materials) from being thrown into the air and/or into the rider of the micromobility transit vehicle 600 by the rotating tire. A bottom housing 650 may be connected to the frame 602 to conceal and/or protect portions of the propulsion system 604, chain stays 636, bottom bracket 610, or other portions of the micromobility transit vehicle 600.

In embodiments, the micromobility transit vehicle 600 includes a lock assembly 654 configured to lock the micromobility transit vehicle 600 to an object, such as a bike rack, a pole, or other structure. The lock assembly 654 may include a lock 656 and a lock cable 658. In such embodiments, the lock cable 658 may be wrapped around the securing object and connected to the lock 656 to secure the micromobility transit vehicle 600 in place. For example, the lock cable 658 may include a pin 660 that is received within a lock cylinder 662 of the lock 656 to secure the micromobility transit vehicle 600. The pin 660 may be held in a holster 664 when not secured to the lock 656. When the pin 660 is secured within the holster 664, the lock cable 658 may extend adjacent the rear fender 648 and in a position that does not interfere with the rider. As shown, the lock cable 658 may be rotatably connected to the seat stay 614. For example, the end of the lock cable 658 may rotate about a portion of the seat stay 614 to facilitate a positioning and/or locking of the lock cable 658.

Figure 7:
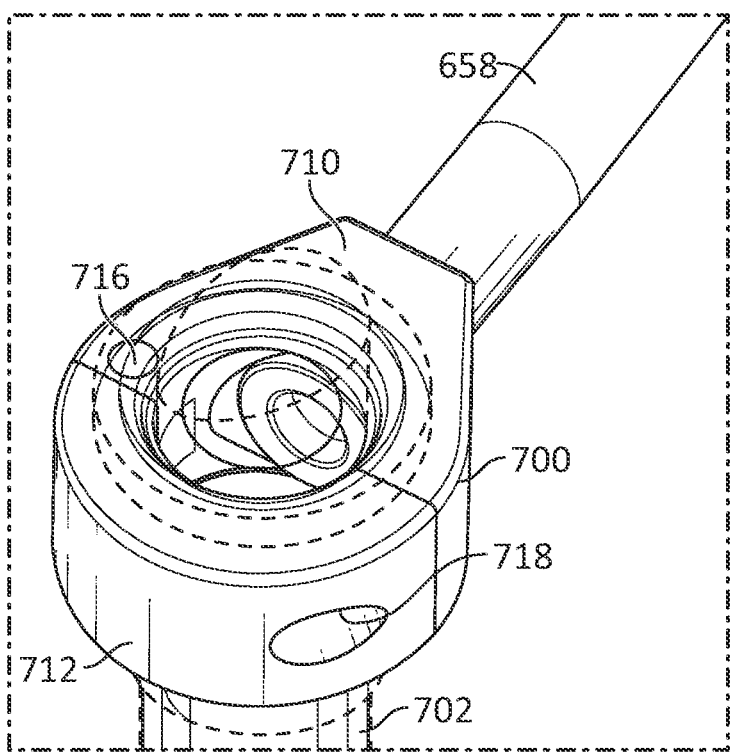
FIG. 7 illustrates a diagram of a lock cable secured to a seat stay of the micromobility transit vehicle of FIG. 6, with portions of the micromobility transit vehicle removed for illustration purposes, in accordance with an embodiment of the disclosure.

FIG. 7 illustrates a diagram of the lock cable 658 secured to the seat stay 614, with portions of the micromobility transit vehicle 600 removed for illustrations purposes, in accordance with an embodiment of the disclosure. As shown, the lock cable 658 may include a collar 700 connecting the lock cable 658 to the seat stay 614, such as to a post 702 of the seat stay 614. The collar 700, which may be sleeve, may be rotatably connected to the post 702. The collar 700 may include many configurations. For example, the collar 700 may include a split collar configuration rotatably connecting the collar 700 to the seat stay 614. As shown, the collar 700 may include a first half 710 and a second half 712 connected together to form a split collar clamp around the seat stay 614. The first half 710 may be connected to the lock cable 658, such as to an end of the lock cable 658. The second half 712 may be pinned or fastened to the first half 710 to secure the halves together. In embodiments, the second half 712 may be rotatably connected to the first half 710. For instance, a first pin or fastener 716 may rotatably connect the second half 712 to the first half 710, such that the second half 712 can be rotated towards or away from the first half 710 as needed (e.g., to position the collar 700 around the seat stay 614). A second pin or fastener 718 may secure the first half 710 to the second half 712 to limit rotation of the second half 712 away from the first half 710. Such embodiments are exemplary only, and the lock cable 658 may be secured to the seat stay 614 in other configurations. When secured to the seat stay 614, the collar 700 may rotate about the seat stay 614 to position the lock cable 658 as desired.

Figure 8:
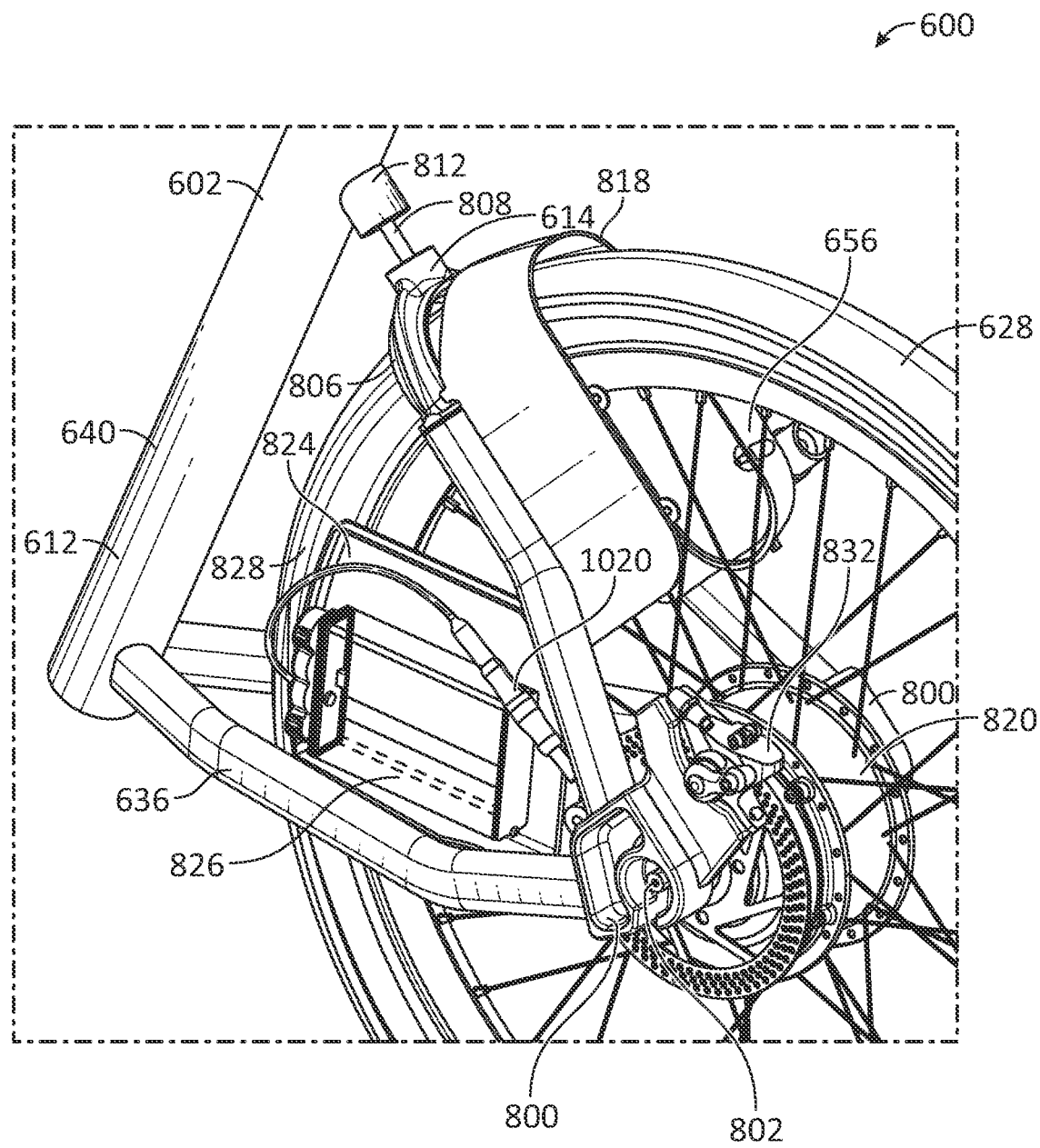
FIG. 8 illustrates a diagram of the micromobility transit vehicle of FIG. 6 with a rear fender removed for illustration purposes, in accordance with an embodiment of the disclosure.
Figure 9:
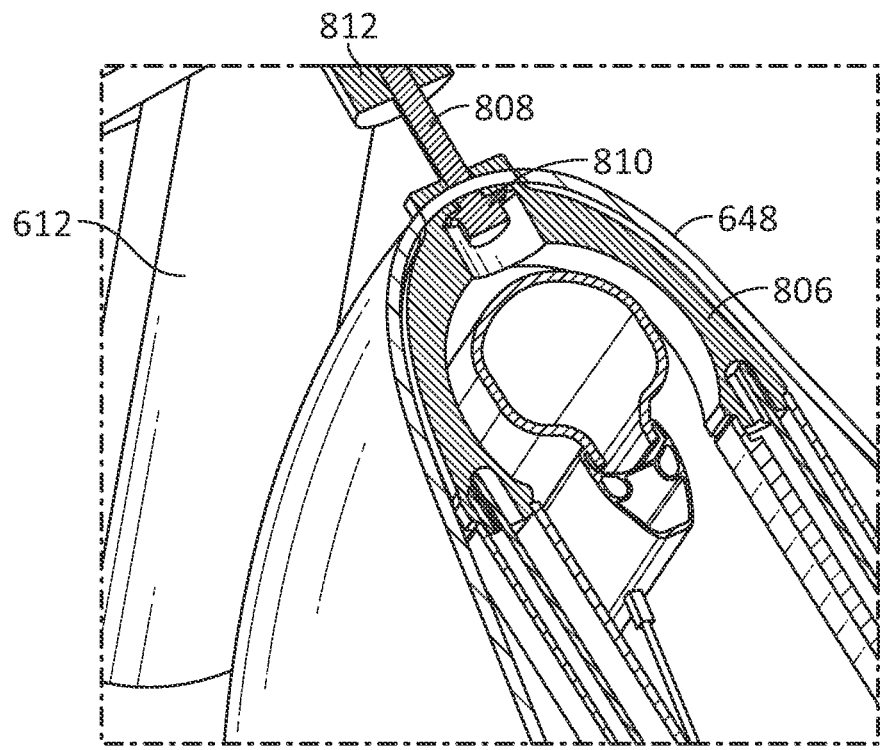
FIG. 9 illustrates a cross-sectional illustration of a portion of the seat stay, in accordance with an embodiment of the disclosure.

FIG. 8 illustrates a diagram of the micromobility transit vehicle 600 with the rear fender 648 and lock cable 658 removed for illustration purposes, in accordance with an embodiment of the disclosure. FIG. 9 illustrates a cross-sectional illustration of a portion of the seat stay 614, in accordance with an embodiment of the disclosure. Referring to FIG. 8, the frame 602 (e.g., the rear triangle 640) may include a pair of rear dropouts 800 that support the rear wheel 628. For example, the rear wheel 628 may include a rear axle 802 coupled to the rear dropouts 800 to secure the rear wheel 628 to the frame 602. The rear dropouts 800 may be configured to allow the rear wheel 628 to be removed without removal of the rear axle 802. For instance, the rear dropouts 800 may include a forked structure allowing the rear axle 802 to be slid into the rear dropouts 800. The chain stays 636 may be disposed between the seat tube 612 and the rear dropouts 800.

As shown, the seat stay 614 is disposed between the seat tube 612 and the pair of rear dropouts 800. The seat stay 614 may include a wishbone shape. In FIG. 8, the seat stay 614 includes a fork 806 and a post 808 connecting the fork 806 to the seat tube 612. Depending on the application, the post 808 may be formed integrally with the fork 806 or the post 808 may be a separate element connected to the fork 806. For example, as shown in FIG. 9, the post 808 may be a rod, pin, bolt, or other fastener 810 (among other elements) that extends through a portion of the fork 806 for connection with the seat tube 612 or with a boss 812 extending from the seat tube 612. The post 808 may be threaded to the seat tube 612 (e.g., to the boss 812), or the post 808 may be welded to the seat tube 612 (e.g., to the boss 812). In embodiments, the lock cable 658 is rotatably connected to the post 808 of the seat stay 614. For instance, the collar 700 may be rotatably connected to the post 808, such as between the boss 812 and the fork 806, to connect the lock cable 658 to the seat stay 614. Connection of the collar 700 to the post 808 may allow the lock cable 658 to rotate around the post 808 about an axis defined by or parallel to the post 808.

Referring to FIG. 6, the collar 700 may form part of the integral structure of the seat stay 614. For instance, the collar 700 may be positioned between the boss 812 and the fork 806 to transfer one or more loads through the collar 700 and along the seat stay 614. As shown in FIG. 6, the rear fender 648 may extend around and conceal the fork 806 of the seat stay 614, among other components.

Referring to FIG. 8, the micromobility transit vehicle 600 may include a yoke 818 attached to the seat stay 614. The yoke 818 may be connected to the fork 806 of the seat stay 614. The yoke 818 may be positioned at least partially beneath the rear fender 648. As shown, the lock 656 is attached to the yoke 818. For instance, the lock 656 may extend through the rear fender 648 for connection with the yoke 818. The connection of the lock 656 to the yoke 818, as well as one or more control cables to the lock 656 may be positioned beneath the rear fender 648. The connection and/or control cables may be protected or shielded from view or access. As a result, the lock 656 may be positioned for inaccessibility from an underside of the micromobility transit vehicle 600, such as to avoid unwarranted tampering of the lock 656. The yoke 818 may be a horseshoe-shaped bracket designed to provide spring-like play or movement for a compliant base for the lock 656 and to reduce impact forces. For example, the yoke 818 may allow compliant movement of the lock 656 without damage to the rear fender 648 or other portion of the micromobility transit vehicle 600 when the vehicle is locked in place.

FIG. 8 illustrates other components of the micromobility transit vehicle 600. As shown, the micromobility transit vehicle 600 may include an electric motor 820 coupled to the rear dropouts 800. The electric motor 820 may form or define the hub of the rear wheel 628. A compartment 824 may be defined adjacent to the seat stay 614, with a motor control unit (MCU) 826 positioned within the compartment 824. The MCU 826 may be positioned longitudinally adjacent to a chain stay 636, such as at a position between the rear axle 802 and a rear tire 828 of the rear wheel 628. In embodiments, the MCU 826 may be positioned between chain stay 636 and seat stay 614. In this manner, the compartment 824 may take advantage of available space within the rear fender 648 and position the MCU 826 adjacent to the rear wheel 628, such as near the electric motor 820. In addition, the MCU 826 may be secured from tampering from an underside of the micromobility transit vehicle 600. In embodiments, the micromobility transit vehicle 600 may include a braking system connected to at least one of the rear dropouts 800. For instance, a rear caliper 832 may be connected to one of the rear dropouts 800.

Figure 10:
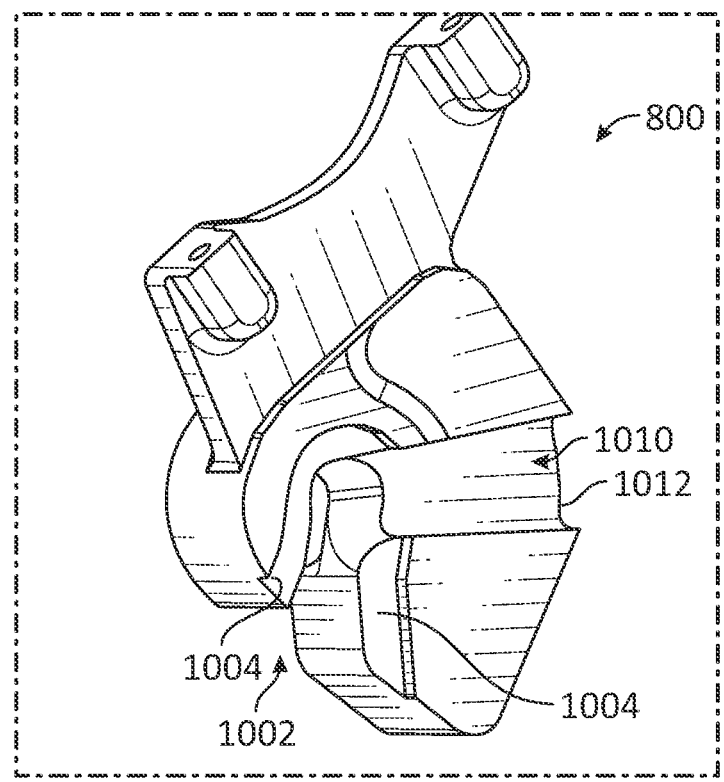
FIG. 10 illustrates a diagram of a rear dropout, in accordance with an embodiment of the disclosure.
Figure 11:
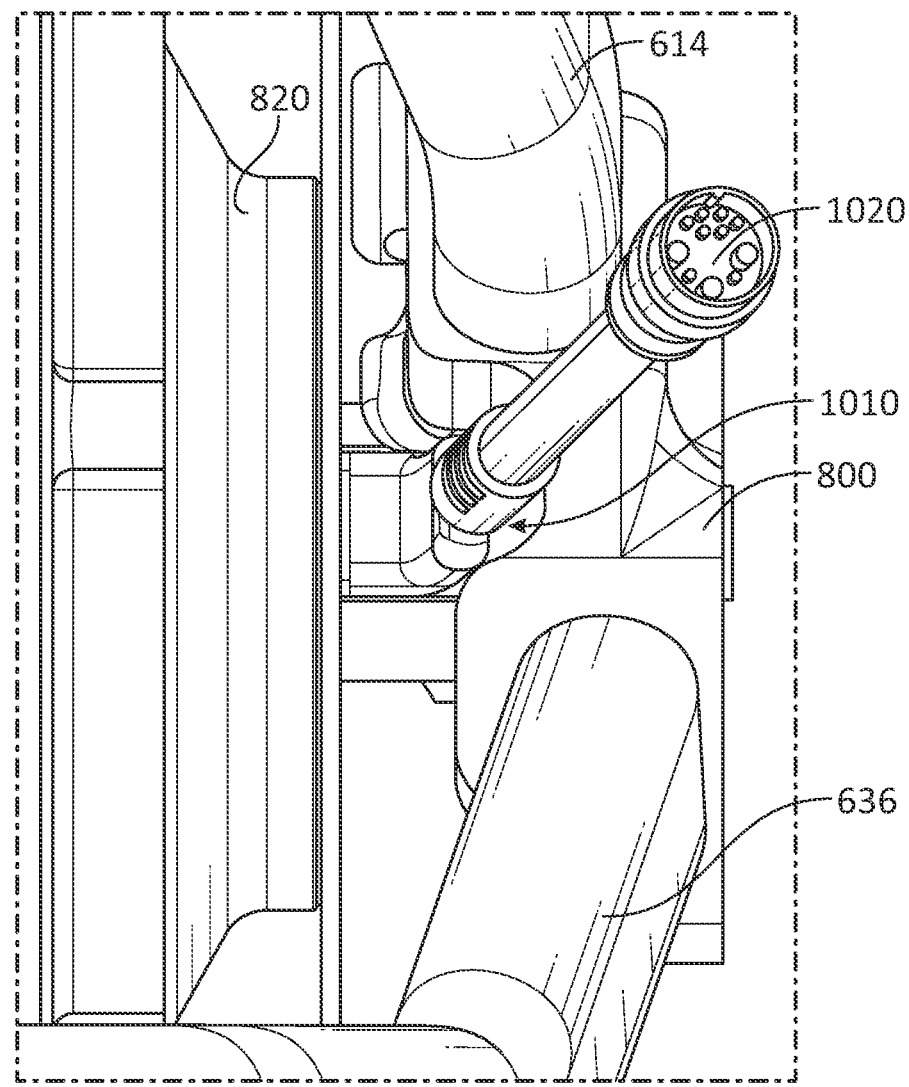
FIG. 11 illustrates a diagram of a motor cable running through a channel disposed in the rear dropout, in accordance with an embodiment of the disclosure.

FIG. 10 illustrates a diagram of a rear dropout in accordance with an embodiment of the disclosure. FIG. 11 illustrates a diagram of a motor cable running through a channel disposed in the rear dropout in accordance with an embodiment of the disclosure. FIGS. 10 and 11 illustrate one of the rear dropouts 800 (e.g., the left rear dropout), although the other rear dropout 800 may include a similar structure. Referring to FIG. 10, the rear dropout 800 may include a vertical dropout structure with a vertical notch 1002 to receive the rear axle 802 of the rear wheel 628. The rear dropout 800 includes one or more load bearing axle interfaces 1004 (e.g., surfaces) that engage a portion of the rear wheel 628 (e.g., a hub, the rear axle 802, an axle nut, etc.) to secure the rear wheel 628 in place. For example, a portion of the rear wheel 628 may abut against and frictionally engage the load bearing axle interfaces 1004 when the rear axle 802 is tightened against the rear dropout 800.

In embodiments, the rear dropout 800 includes a channel 1010 disposed therein, such as disposed from the vertical notch 1002 to a front 1012 of the rear dropout 800. Referring to FIG. 11, the channel 1010 may be configured to receive a motor cable 1020 running to the electric motor 820. For example, the motor cable 1020 may run from the electric motor 820, through the channel 1010 of the rear dropout 800, and into the compartment 824 for connection with the MCU 826 (see FIG. 8). As a result, the motor cable 1020 may be shielded and protected during use. For example, the motor cable 1020 may be concealed within the channel 1010 to provide a tamper protection, such as due to the rear dropout 800 concealing the motor cable 1020 from view or access.

Figure 12A:
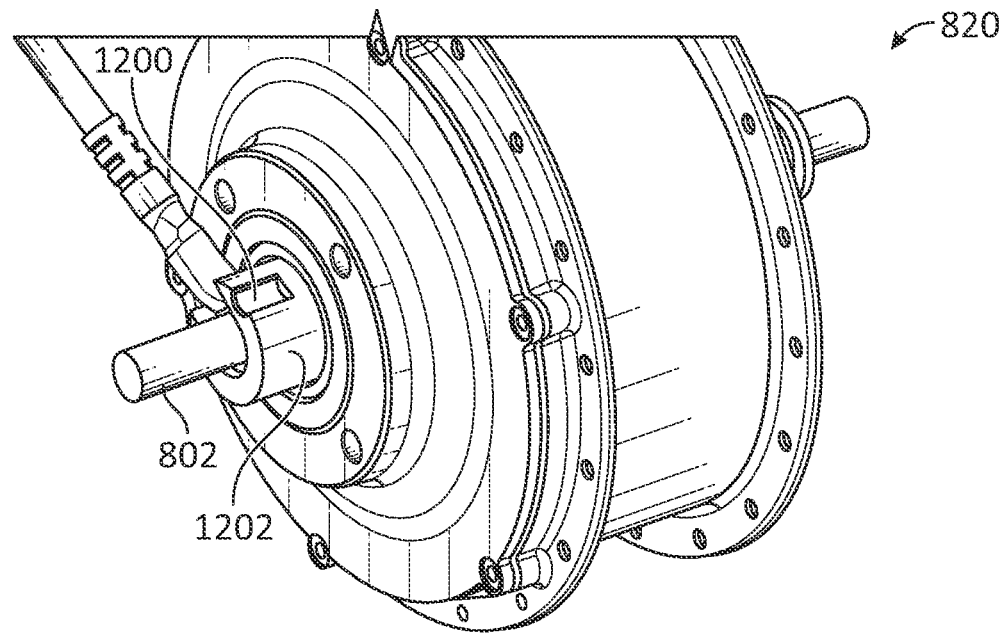
FIG. 12A illustrates a diagram of an electric motor, in accordance with an embodiment of the disclosure.
Figure 12B:
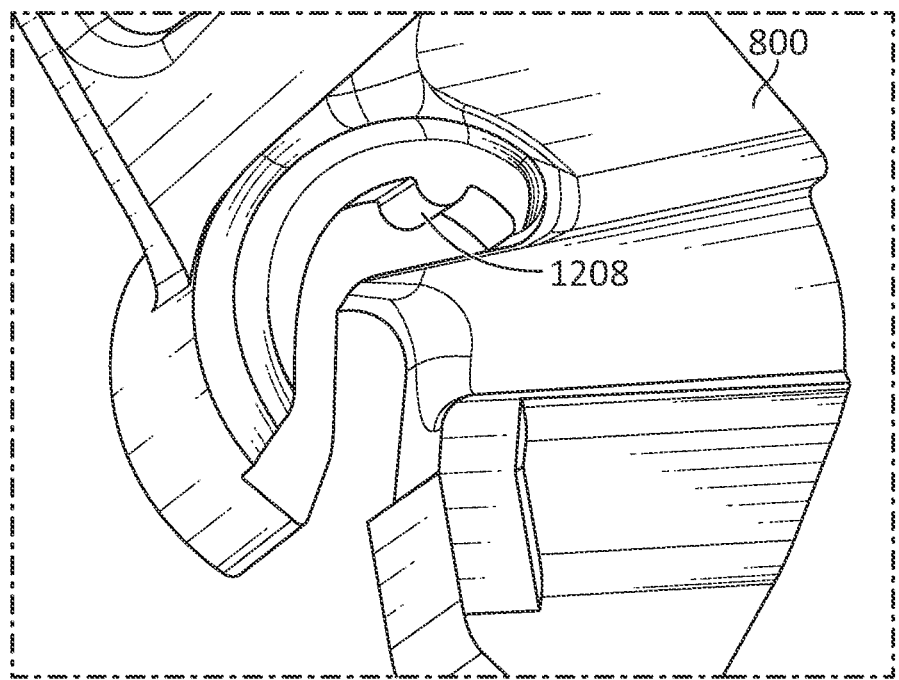
FIG. 12B illustrates a diagram of a rear dropout with structure configured to interface with the electric motor of FIG. 12A, in accordance with an embodiment of the disclosure.

FIG. 12A illustrates a diagram of the electric motor 820, in accordance with an embodiment of the disclosure. FIG. 12B illustrates a diagram of the rear dropout 800 with structure configured to interface with the electric motor 820, in accordance with an embodiment of the disclosure. Referring to FIGS. 12A and 12B, the electric motor 820 and rear dropout 800 may be complementarily shaped to positively lock together. For example, referring to FIG. 12A, a groove 1200 may be disposed in the electric motor 820, such as defined in an end bushing or collar 1202 that abuts against the load bearing axle interfaces 1004 of the rear dropout 800. The end bushing/collar 1202 may form or define at least a portion of the rear axle 802. Referring to FIG. 12B, the rear dropout 800 may include a spline 1208 that is complementary to the groove 1200. Connection of the electric motor 820 to the rear dropout 800 may position the spline 1208 of the rear dropout 800 within the groove 1200 of the electric motor 820 to positively lock the electric motor 820 to the rear dropout 800. For instance, positive engagement of the spline 1208 within the groove 1200 may rotationally lock the electric motor 820 in place, such as limiting rotation of the end bushing/collar 1202 of the electric motor 820 relative to the rear dropout 800. In embodiments, the groove 1200 and spline 1208 may extend parallel to the rear axle 802, although other configurations are contemplated.

Figure 12C:
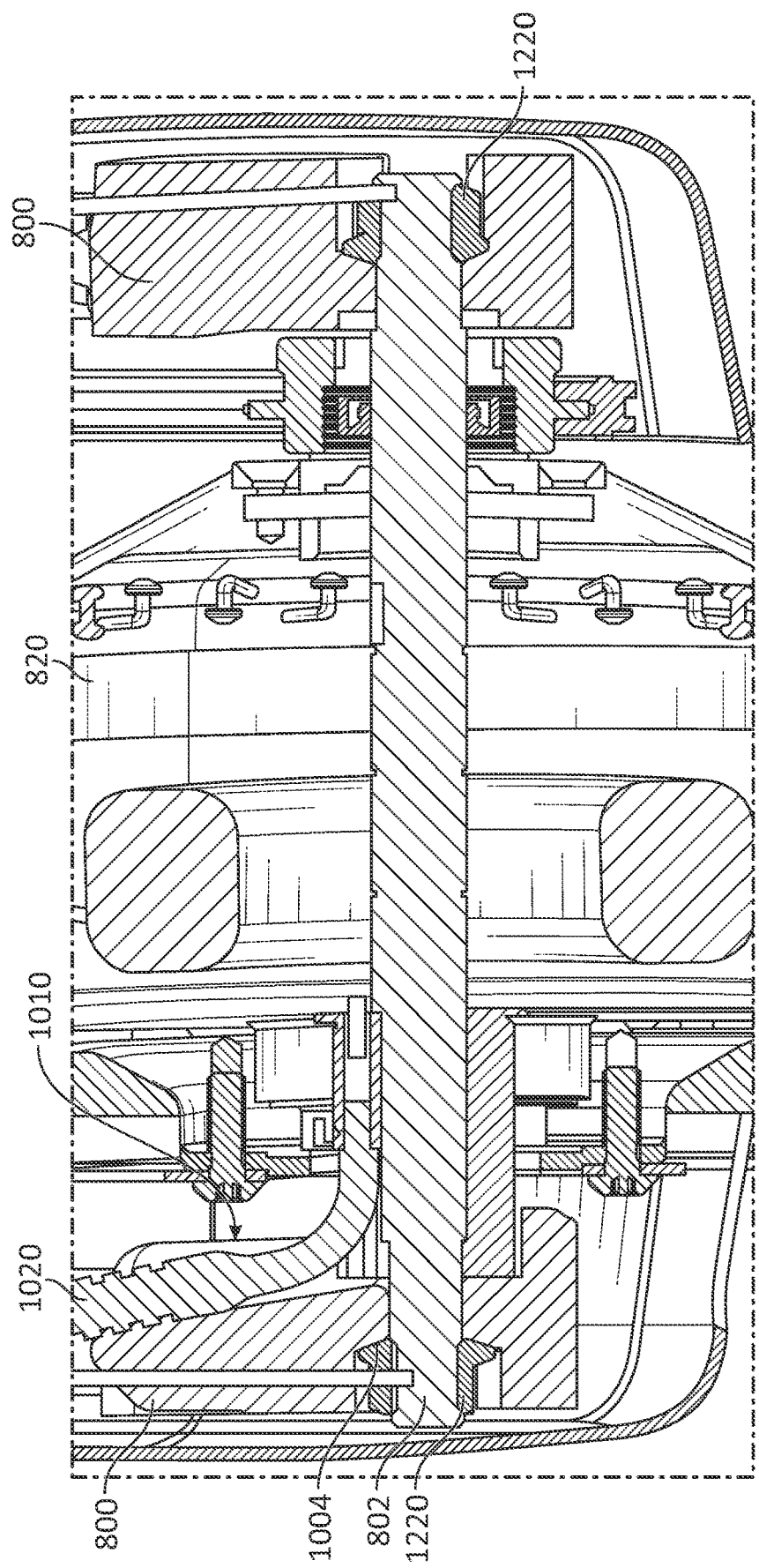
FIG. 12C illustrates a cross-sectional illustration of an axle nut interface with the rear dropout, in accordance with an embodiment of the disclosure.

FIG. 12C illustrates a cross-sectional illustration of an axle nut interface with the rear dropout 800, in accordance with an embodiment of the disclosure. Referring to FIG. 12C, the rear axle 802 may be secured to the rear dropouts 800 via one or more axle nuts 1220. For example, one or more axle nuts 1220 may be threaded to the rear axle 802 and tightened against a load bearing axle interface 1004 of the rear dropouts 800. In some embodiments, the axle nut 1220 and/or the rear dropout 800 may be shaped or otherwise configured to facilitate concentricity of the rear axle 802 with the rear dropouts 800 when torqued. For instance, engagement surfaces of the axle nut 1220 and the rear dropout 800 (e.g., a portion of the load bearing axle interface 1004) may have a conical or substantially conical shape. The engagement surfaces may be complementary in shape, such that engagement of the axle nut 1220 with the load bearing axle interface 1004 of the rear dropout 800 aligns the axle nut 1220 and rear axle 802 with the rear dropout 800 as the axle nut 1220 is torqued. In embodiments, the interface between the axle nut 1220 and the rear dropout 800 may facilitate engagement of the spline 1208 within the groove 1200, such as driving or forcing the splined engagement to close and have a tight mate. Depending on the application, the interface may have a 20-degree conical angle, although other configurations are contemplated.

Figure 13:
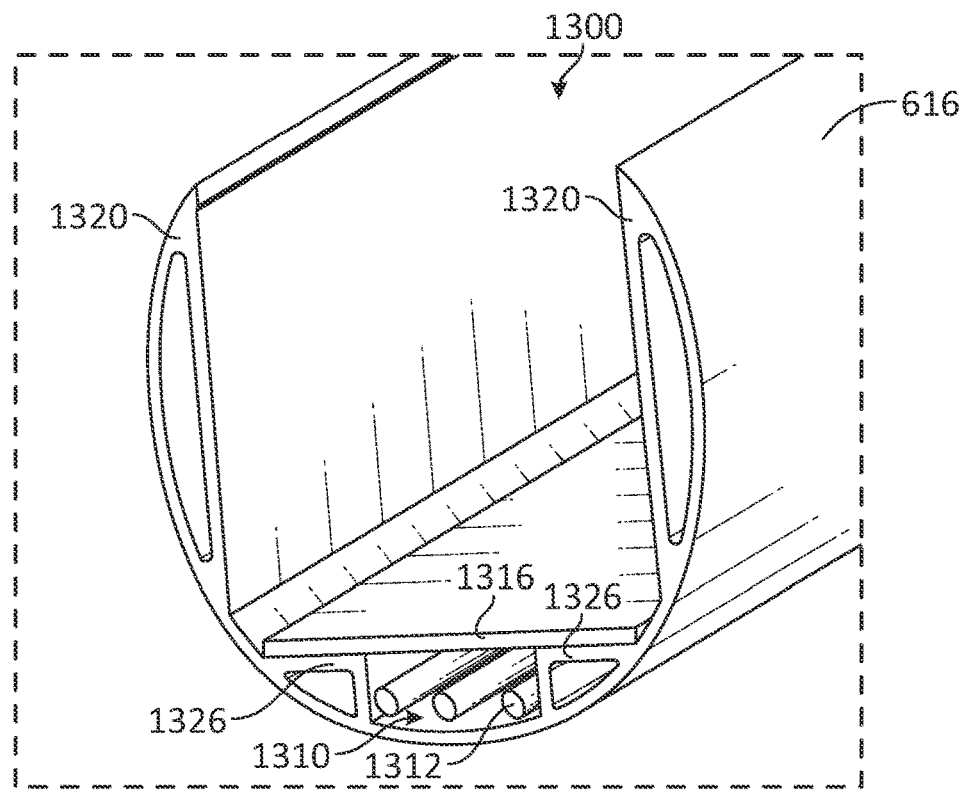
FIG. 13 illustrates a cross-sectional diagram of a downtube of the micromobility transit vehicle, in accordance with an embodiment of the disclosure.

FIG. 13 illustrates a cross-sectional diagram of the downtube 616 of the micromobility transit vehicle 600, in accordance with an embodiment of the disclosure. Referring to FIG. 13, a battery compartment 1300 may be disposed in the downtube 616. As shown, the battery compartment 1300 may be created in, formed in, defined in, or otherwise provided by the downtube 616 along a length of the downtube 616, such as between the headtube and the bottom bracket 610. The battery compartment 1300 may extend along any suitable portion (length or location) of the downtube 616. Although the battery compartment 1300 is shown and described as disposed in the downtube 616, the battery compartment 1300 may be disposed in a different portion of the frame 602, such as in the seat tube 612, in a top tube, in a combination of two or more tubes, or the like. Thus, reference to the battery compartment 1300 disposed in the downtube 616 of the frame 602 is by way of example only.

The battery 606 may be receivable within the battery compartment 1300 of the downtube 616. As a result, the battery 606 may be integrated into or placed within the frame 602, rather than exposed. For example, at least a portion of the battery 606 may be positioned within the battery compartment 1300 to secure the battery 606 to the frame 602. In such embodiments, the battery compartment 1300 may be shaped to receive the battery 606 or at least a portion of the battery 606 therein. Such configurations may provide a secure attachment of the battery 606 to the frame 602. Additionally, or alternatively, such configurations may provide an attachment that is less prone to vandalism and/or damage or at least limits vandalism and/or damage to the battery 606. For example, receipt of the battery 606 at least partially within the battery compartment 1300 may shield vulnerable portions of the battery 606 positioned within the frame 602. In embodiments, the battery 606 and/or the securement of the battery 606 within the battery compartment 1300 may be similar to that described in U.S. patent application Ser. No. 16/917,102, filed Jun. 30, 2020, and entitled "MICROMOBILITY TRANSIT VEHICLE BATTERY CONNECTION AND LOCK SYSTEMS AND METHODS," which is incorporated herein by reference in its entirety.

With continued reference to FIG. 13, a cable channel 1310 may be disposed along a bottom of the battery compartment 1300 to route one or more cable 1312 below the battery 606 and through the downtube 616. The one or more cable 1312 may be positioned within the cable channel 1310 to limit or prevent pinching with the battery 606 and the battery compartment 1300. In embodiments, a cover 1316 may be positioned above the cable channel 1310 to shield, protect, or otherwise cover the one or more cable 1312 routed through the cable channel 1310. The cable 1312 may be electrical cables (e.g., power cables, communication cables, data cables, etc.) or control cables (e.g., brake cables, throttle cables, etc.), among others, or any combination thereof.

In embodiments, the downtube 616 may include one or more strengthening features to increase the stiffness of the downtube 616 at the battery compartment 1300. For example, the downtube 616 may include a pair of internal sidewalls 1320 at least partially defining the battery compartment 1300. A pair of shelves 1326 may extend along the bottom of the downtube 616. The cable channel 1310 may be disposed between the pair of shelves 1326. The cover 1316 may rest on or be attached to the shelves 1326. Such configurations are illustrative only, and the downtube 616 may include other profile shapes that increase the cross-sectional strength, stiffness, or rigidity of the downtube 616.

Figure 14:
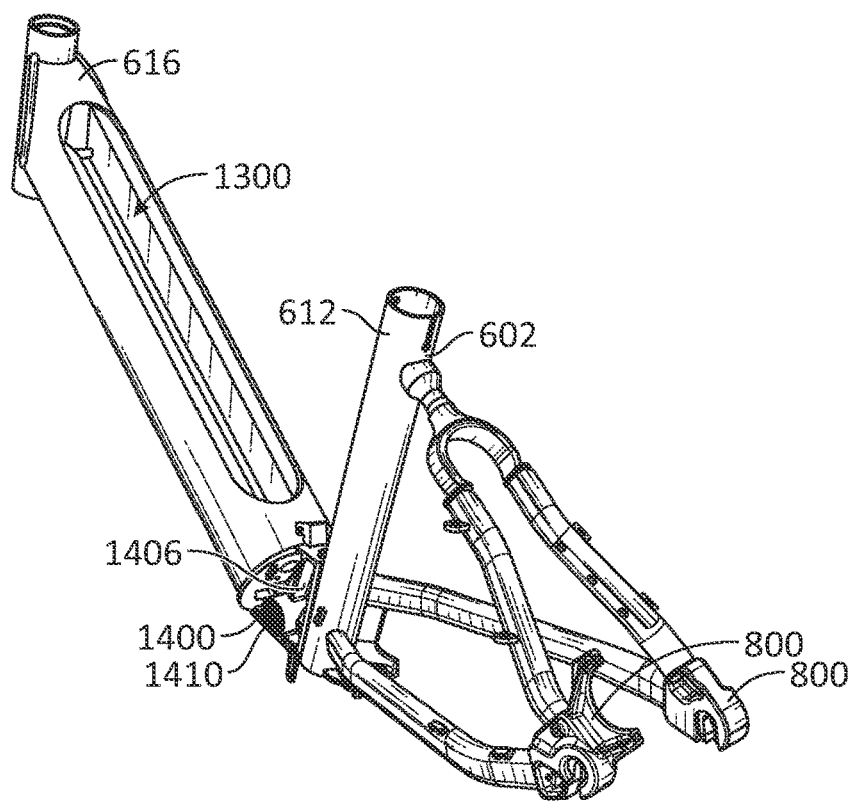
FIG. 14 illustrates a diagram of a frame of the micromobility transit vehicle, in accordance with an embodiment of the disclosure.

FIG. 14 illustrates a diagram of the frame 602, in accordance with an embodiment of the disclosure. Referring to FIG. 14, the frame 602 may include a bottom bracket node 1400 connecting the downtube 616 to the seat tube 612. The bottom bracket node 1400 may be structured for strength and/or rigidity. The bottom bracket node 1400 may be a separate element connected to the downtube 616 and the seat tube 612. Depending on the application, the bottom bracket node 1400 may be extruded, forged, or cast into shape. As shown, the bottom bracket node 1400 may include a profile shape with one or more (e.g., a plurality of) ribs 1406. The ribs 1406 may provide structural support to the frame 602, such as to enable the frame 602 to be structurally robust for ridesharing. For example, the ribs 1406 may provide a structural strength/rigidity to the frame 602 allowing the micromobility transit vehicle 600 to be used multiple times by various riders of different weights/abilities and in various conditions or under various requirements. The bottom bracket node 1400 may accept a portion of the crankset 620. For example, the bottom bracket node 1400 may include a bore 1410 that rotatably supports the crankset 620.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

One or more features or functions described herein may be included or omitted, or enabled or disabled on an opt-in basis, particularly for optimizing rider safety, comfort, and reliability. For example, a rider may choose to turn on or turn off, or use or not use, one or more of the features or functions described herein for their personal safety and comfort. In some instances, these features or functions may be turned on temporarily and/or turned on automatically to maximize rider safety and comfort, among various other possibilities.

Embodiments described above illustrate but do not limit the invention. It should also be understood that numerous modifications and variations are possible in accordance with the principles of the invention. Accordingly, the scope of the invention is defined only by the following claims.

What is claimed is:

1. A micromobility transit vehicle, comprising:
a wishbone seat stay comprising a fork and a post configured to connect the fork to a seat tube;
a collar connected to the post and rotatable around the post; and
a lock cable connected to the collar to rotate about the post.

2. The micromobility transit vehicle of claim 1, further comprising:
the seat tube; and
wherein the post is defined by a fastener threaded to a boss extending from the seat tube.

3. The micromobility transit vehicle of claim 1, wherein the collar comprises a split collar configuration rotatably connecting the collar to the post.

4. The micromobility transit vehicle of claim 1, further comprising:
a yoke attached to the seat stay; and
a lock attached to the yoke, wherein the lock cable is securable to the lock to secure the micromobility transit vehicle.

5. The micromobility transit vehicle of claim 4, wherein the lock is positioned for inaccessibility from an underside of the micromobility transit vehicle to avoid unwarranted tampering of the lock.

6. The micromobility transit vehicle of claim 1, further comprising:
a pair of rear dropouts; and
an electric motor positively locked to the pair of rear dropouts.

7. The micromobility transit vehicle of claim 6, wherein a rear dropout of the pair of rear dropouts comprises a spline that engages a groove disposed in the electric motor to rotationally lock the electric motor in place.

8. The micromobility transit vehicle of claim 6, wherein:
a rear dropout of the pair of rear dropouts comprises a channel disposed therein to receive a motor cable running to the electric motor; and
further comprising an axle nut securing a rear axle to the rear dropout, the axle nut and rear dropout comprising complementary conical surfaces that engage to facilitate a concentricity between the rear axle and the rear dropout and drive an engagement of a spline into a groove.

9. The micromobility transit vehicle of claim 1, further comprising:
a compartment defined adjacent to the wishbone seat stay; and
a motor control unit (MCU) positioned within the compartment and secured from tampering from an underside of the micromobility transit vehicle.

10. The micromobility transit vehicle of claim 9, further comprising:
- a rear wheel comprising a rear tire and a rear axle coupled to a pair of rear dropouts; and
- a pair of chain stays disposed between the seat tube and the pair of rear dropouts;
- wherein the MCU is positioned longitudinally adjacent a chain stay of the pair of chain stays at a position between the rear axle and the rear tire and between the chain stay and the wishbone seat stay.

11. The micromobility transit vehicle of claim 1, further comprising:
- a downtube having a battery; and
- a bottom bracket node connecting the downtube to the seat tube and comprising one or more ribs configured to provide structural support to the frame.

12. The micromobility transit vehicle of claim 11, further comprising:
- a battery compartment disposed in the downtube to receive the battery; and
- a cable channel disposed along a bottom of the battery compartment to route one or more cables below the battery and through the downtube.

13. A micromobility transit vehicle comprising:
- a rear triangle comprising:
    - a seat tube;
    - a pair of rear dropouts;
    - a pair of chain stays extending between the seat tube and the pair of rear dropouts; and
    - a wishbone seat stay comprising a fork connected to the pair of rear dropouts and a post connecting the fork to the seat tube;
- a rear wheel comprising a rear axle coupled to the pair of rear dropouts;
- a collar connected to the post and rotatable around the post; and
- a lock cable connected to the collar to rotate about the post.

14. The micromobility transit vehicle of claim 13, further comprising:
- a lock connected to the fork of the seat stay and configured to lock-to an end of the lock cable to secure the micromobility transit vehicle; and
- a rear fender concealing at least a portion of the fork and an attachment of the lock to the fork.

15. The micromobility transit vehicle of claim 13, further comprising:
- an electric motor comprising a groove disposed therein;
- a rear dropout of the pair of rear dropouts comprising a spline that engages the groove of the electric motor to positively lock the electric motor to the pair of rear dropouts; and
- an axle nut comprising a conical surface configured to engage a complementary conical surface of the rear dropout to position the spline into the groove.

16. The micromobility transit vehicle of claim 15, wherein:
- the rear dropout comprises a channel disposed therein to receive a motor cable running to the electric motor; and
- each rear dropout of the pair of rear dropouts comprises a vertical dropout structure to receive the rear axle.

17. A method of locking a micromobility transit vehicle comprising a seat tube, a wishbone seat stay comprising a fork and a post connecting the fork to the seat tube, and a lock cable rotatably connected to the post, the method comprising:
- rotating the lock cable about the post to position a pin of the lock cable adjacent to a lock; and
- engaging the pin with the lock.

18. The method of claim 17, wherein rotating the lock cable about the post comprises rotating a collar of the lock cable around the post.

19. The method of claim 18, wherein:
- the post is defined by a fastener threaded to a boss extending from the seat tube; and
- the collar comprises a split collar configuration rotatably connecting the collar to the post.

20. The method of claim 17, wherein the micromobility transit vehicle comprises:
- an electric motor comprising a groove disposed therein;
- a rear dropout comprising a spline that engages the groove of the electric motor to positively lock the electric motor to the rear dropout;
- a motor control unit (MCU);
- a channel disposed in the rear dropout; and
- a motor cable extending from the MCU to the electric motor and at least partially within the channel disposed in the rear dropout.

* * * * *